(12) United States Patent
Sekar et al.

(10) Patent No.: US 12,067,613 B2
(45) Date of Patent: Aug. 20, 2024

(54) TECHNOLOGIES FOR DATA BIDDING AND NEGOTIATING IN AN ENTERPRISE SYSTEM USING A PERMISSIONED BLOCKCHAIN INFRASTRUCTURE

(71) Applicant: Genesys Cloud Services, Inc., Menlo Park, CA (US)

(72) Inventors: Archana Sekar, Chennai (IN); Javier Villalobos, Daly City, CA (US); Yochai Konig, San Francisco, CA (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

(21) Appl. No.: 17/029,869

(22) Filed: Sep. 23, 2020

(65) Prior Publication Data
US 2022/0092686 A1 Mar. 24, 2022

(51) Int. Cl.
*G06Q 30/08* (2012.01)
*G06Q 40/04* (2012.01)
(Continued)

(52) U.S. Cl.
CPC ............ *G06Q 30/08* (2013.01); *G06Q 40/04* (2013.01); *H04L 9/0643* (2013.01); *H04L 9/50* (2022.05)

(58) Field of Classification Search
CPC ........ G06Q 30/08; G06Q 30/06; G06Q 30/00; G06Q 40/04; G06Q 40/00; H04L 9/0643;
(Continued)

(56) References Cited

U.S. PATENT DOCUMENTS

2002/0165844 A1\* 11/2002 Lee .................. G06Q 40/04
706/61
2003/0041012 A1\* 2/2003 Grey .................. G06Q 30/08
705/37
(Continued)

OTHER PUBLICATIONS

Dragonchain; What Different Types of Blockchains are There?; Blockchain; Apr. 18, 2019; 9 pages.
(Continued)

*Primary Examiner* — Edward Chang
*Assistant Examiner* — Divesh Patel
(74) *Attorney, Agent, or Firm* — Taft Stettinius & Hollister LLP

(57) ABSTRACT

A method for data bidding in an enterprise system comprising a first enterprise and a second enterprise using a permissioned blockchain infrastructure according to one embodiment includes receiving, by an end user device, a request for data from an end user; generating, by the end user device, an announcement including the request for data to the enterprise system, wherein the announcement initiates the data bidding by the enterprise system; receiving, by the end user device, at least one bid including requested data of at least one of the first enterprise and the second enterprise in response to the announcement; analyzing, by the end user device, the at least one bid from the at least one of the first enterprise and the second enterprise; selecting, by the end user device, the at least one of the first enterprise and the second enterprise; displaying, by the end user device, the at least one of the first enterprise and the second enterprise to the end user; receiving, by the end user device, an indication that the end user has selected the first enterprise; and transmitting, by the first enterprise, the requested data to the end user thereby completing a data transaction.

15 Claims, 20 Drawing Sheets

(51) Int. Cl.
*H04L 9/00* (2022.01)
*H04L 9/06* (2006.01)

(58) Field of Classification Search
CPC ......... H04L 9/06; H04L 9/00; H04L 2209/38; H04L 2209/00
See application file for complete search history.

(56) References Cited

U.S. PATENT DOCUMENTS

| | | | | |
|---|---|---|---|---|
| 2008/0120244 | A1* | 5/2008 | Mello | G06Q 30/06 705/80 |
| 2010/0145815 | A1* | 6/2010 | Weng | G06Q 30/0601 705/26.1 |
| 2013/0006794 | A1* | 1/2013 | Horvitz | G06Q 30/08 705/26.2 |
| 2015/0221024 | A1* | 8/2015 | Sirsi | G06Q 30/08 705/26.3 |
| 2017/0032461 | A1* | 2/2017 | Zheng | G06Q 40/04 |
| 2020/0058007 | A1* | 2/2020 | Karame | G06Q 20/405 |
| 2020/0059369 | A1* | 2/2020 | Li | H04L 9/3247 |
| 2021/0241372 | A1* | 8/2021 | Chen | G06F 16/2379 |

OTHER PUBLICATIONS

Anastasiia Lastovetska; Blockchain Architecture Basics: Components, Structure, Benefits & Creation; MLSDev; 23 pages.
Kiran Vaidya; The Byzantine Generals' Problem; All Things Ledger; 6 pages.
Blockchain 101; What is Blockchain Technology?; Mar. 9, 2017; 38 pages.
Jennifer Sanati; Top 10 Reasons to Setup a Client-Server Network; IT Peer Network; May 2, 2011; 9 pages.
Morgen E. Peck; Blockchains: How They Work and Why They'll Change the World; IEEE Spectrum; Sep. 28, 2017; 11 pages.
Dr. Gideon Greenspan; Why Many Smart Contract Use Cases Are Simply Impossible; CoinDesk: Markets; Apr. 17, 2016; 6 pages.
Satoshi Nakamoto; Bitcoin: A Peer-to-Peer Electronic Cash System; www.bitcoin.org; 9 pages.
Decentralized Oracles (Mainnet); 4 pages.
Steve Ellis et al.; ChainLink—A Decentralized Oracle Network; Sep. 4, 2017; 38 pages; v1.0.
Thomas Bertani; Oraclize, The Provably-Honest Oracle Service, is Finally Here!; Provable Things; Nov. 4, 2015; 3 pages.
Thomas Bertani; Understanding Oracles; Provable Things; Feb. 18, 2016; 6 pages.
Davide Calvaresi et al.; A Goal-Oriented Requirements Engineering Approach for the Ambient Assisted Living Domain; May 2014; 5 pages.
Alevtina Dubovitskaya et al.; A Multiagent System for Dynamic Data Aggregation in Medical Research; Hindawi Publishing Corporation; BioMed Research International; 2016; 13 pages.
Davide Calvaresi et al.; Exploring the Ambient Assisted Living Domain: A Systematic Review; CrossMark; J Ambient Intell Human Comput; May 4, 2016; 19 pages.
Davide Calvaresi et al.; Agent-Based Systems for Telerehabilitation: Strengths, Limitations and Future Challenges; Conference Paper, May 2017; 23 pages.
Karla Kvaternik et al.; Privacy-Preserving Platform for Transactive Energy Systems; Jan. 30, 2018; 6 pages.
Karima Qayumi et al.; Multi-Agent Based Intelligence Generation from Very Large Datasets; 2015 IEEE International Conference on Cloud Engineering; 3 pages.
Alex Norta; Conflict-Resolution Lifecycles for Governed Decentralized Autonomous Organization Collaboration; EGOSE '15; Nov. 24-25, 2015; 14 pages.
S. Ponomarev et al.; Multi-Agent Systems and Decentralized Artificial Superintellegence; Moscow Power Engineering Institute; Moscow Institute of Physics and Technology; 18 pages.
Oliver Belin; The Difference Between Blockchain & Distributed Ledger Technology; Tradeix; Retrieved on: Sep. 23, 2020; 5 pages.

\* cited by examiner

TECHNOLOGIES FOR DATA BIDDING AND NEGOTIATING IN AN ENTERPRISE SYSTEM USING A PERMISSIONED BLOCKCHAIN INFRASTRUCTURE

BACKGROUND

An enterprise may invest significant resources (e.g., time, money, effort, etc.) to make productive usage of data that is accumulated by the enterprise during interactions with end users. With or without the knowledge of an end user, end user data may be a source of innovation and economic opportunity for the enterprise. Data may exist in an unrefined and/or unstructured form, and a substantial undertaking may be required to convert such data into structured data. An enterprise may be able to glean insights from structured data and incorporate such insights into the enterprise's business (e.g., product lines, services, etc.). An enterprise may use incompatible data models to structure its data and may store such data in isolated centralized data repositories. However, the data may be desired by other enterprises. There is not an effective, efficient, automated, and trustworthy platform available to allow the exchange of data among enterprises. Accordingly, trading data is currently so tedious, expensive, inefficient, and legally cumbersome that enterprises and end users often prefer to avoid trading data altogether.

SUMMARY

According to an embodiment, a method for data bidding in an enterprise system comprising a first enterprise and a second enterprise using a permissioned blockchain infrastructure may include receiving, by an end user device, a request for data from an end user; generating, by the end user device, an announcement including the request for data to the enterprise system, wherein the announcement initiates the data bidding by the enterprise system; receiving, by the end user device, at least one bid including requested data of at least one of the first enterprise and the second enterprise in response to the announcement; analyzing, by the end user device, the at least one bid from the at least one of the first enterprise and the second enterprise; selecting, by the end user device, the at least one of the first enterprise and the second enterprise; displaying, by the end user device, the at least one of the first enterprise and the second enterprise to the end user; receiving, by the end user device, an indication that the end user has selected the first enterprise; and transmitting, by the first enterprise, the requested data to the end user thereby completing a data transaction.

In some embodiments, the method may further include negotiating, by the end user device, the at least one bid with the at least one of the first enterprise and the second enterprise in response to receiving the at least one bid.

In some embodiments, the method may further include negotiating, by the at least one of the first enterprise and the second enterprise, the at least one bid with the end user device in response to the negotiating by the end user device.

In some embodiments, the method may further include evaluating, by the at least one of the first enterprise and the second enterprise, the requested data of the at least one of the first enterprise and the second enterprise to determine a match between the request for data and the requested data in response to generating the announcement.

In some embodiments, the at least one of the first enterprise and the second enterprise submits the at least one bid to the end user device based on the match.

In some embodiments, selecting the at least one of the first enterprise and the second enterprise may include comparing end user preferences to the at least one bid to determine a second match.

In some embodiments, the method may further include storing the data transaction on a blockchain by (i) generating a block representing the data transaction in the blockchain infrastructure, (ii) publishing the block to one or more nodes in the blockchain infrastructure, (iii) validating the data transaction at the one or more nodes in the blockchain infrastructure, (iv) adding the block to the blockchain based on a consensus reached among the one or more nodes in the blockchain infrastructure, (v) updating the one or more nodes in the blockchain infrastructure with the block, and (vi) labeling the data transaction as successful.

In some embodiments, the end user device may include a personal bot agent.

In some embodiments, at least one of the enterprise system, the first enterprise, or the second enterprise may include an enterprise agent.

In some embodiments, at least one of the enterprise system, the first enterprise, or the second enterprise may include a contact center system.

According to another embodiment, a system for data bidding using a permissioned blockchain infrastructure may include an enterprise system comprising a first enterprise and a second enterprise; at least one processor; and at least one memory comprising a plurality of instructions stored thereon that, in response to execution by the at least one processor, causes the system to receive, by an end user device, a request for data from an end user; generate, by the end user device, an announcement including the request for data to the enterprise system, wherein the announcement initiates the data bidding by the enterprise system; receive, by the end user device, at least one bid including requested data of at least one of the first enterprise and the second enterprise in response to the announcement; analyze, by the end user device, the at least one bid from the at least one of the first enterprise and the second enterprise; select, by the end user device, the at least one of the first enterprise and the second enterprise; display, by the end user device, the at least one of the first enterprise and the second enterprise to the end user; receive, by the end user device, an indication that the end user has selected the first enterprise; and transmit, by the first enterprise, the requested data to the end user thereby completing a data transaction.

In some embodiments, the plurality of instructions further causes the system to negotiate, by the end user device, the at least one bid with the at least one of the first enterprise and the second enterprise in response to receiving the at least one bid.

In some embodiments, the plurality of instructions further causes the system to negotiate, by the at least one of the first enterprise and the second enterprise, the at least one bid with the end user device in response to the negotiating by the end user device.

In some embodiments, the plurality of instructions further causes the system to evaluate, by the at least one of the first enterprise and the second enterprise, the requested data of the at least one of the first enterprise and the second enterprise to determine a match between the request for data and the requested data in response to generating the announcement.

In some embodiments, the at least one of the first enterprise and the second enterprise submits the at least one bid to the end user device based on the match.

In some embodiments, selecting the at least one of the first enterprise and the second enterprise may include comparing end user preferences to the at least one bid to determine a second match.

In some embodiments, the plurality of instructions further causes the system to store the data transaction on a blockchain by (i) generating a block representing the data transaction in the blockchain infrastructure, (ii) publishing the block to one or more nodes in the blockchain infrastructure, (iii) validating the data transaction at the one or more nodes in the blockchain infrastructure, (iv) adding the block to the blockchain based on a consensus reached among the one or more nodes in the blockchain infrastructure, (v) updating the one or more nodes in the blockchain infrastructure with the block, and (vi) labeling the data transaction as successful.

In some embodiments, the end user device may include a personal bot agent.

In some embodiments, at least one of the enterprise system, the first enterprise, or the second enterprise may include an enterprise agent.

In some embodiments, at least one of the enterprise system, the first enterprise, or the second enterprise may include a contact center system.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
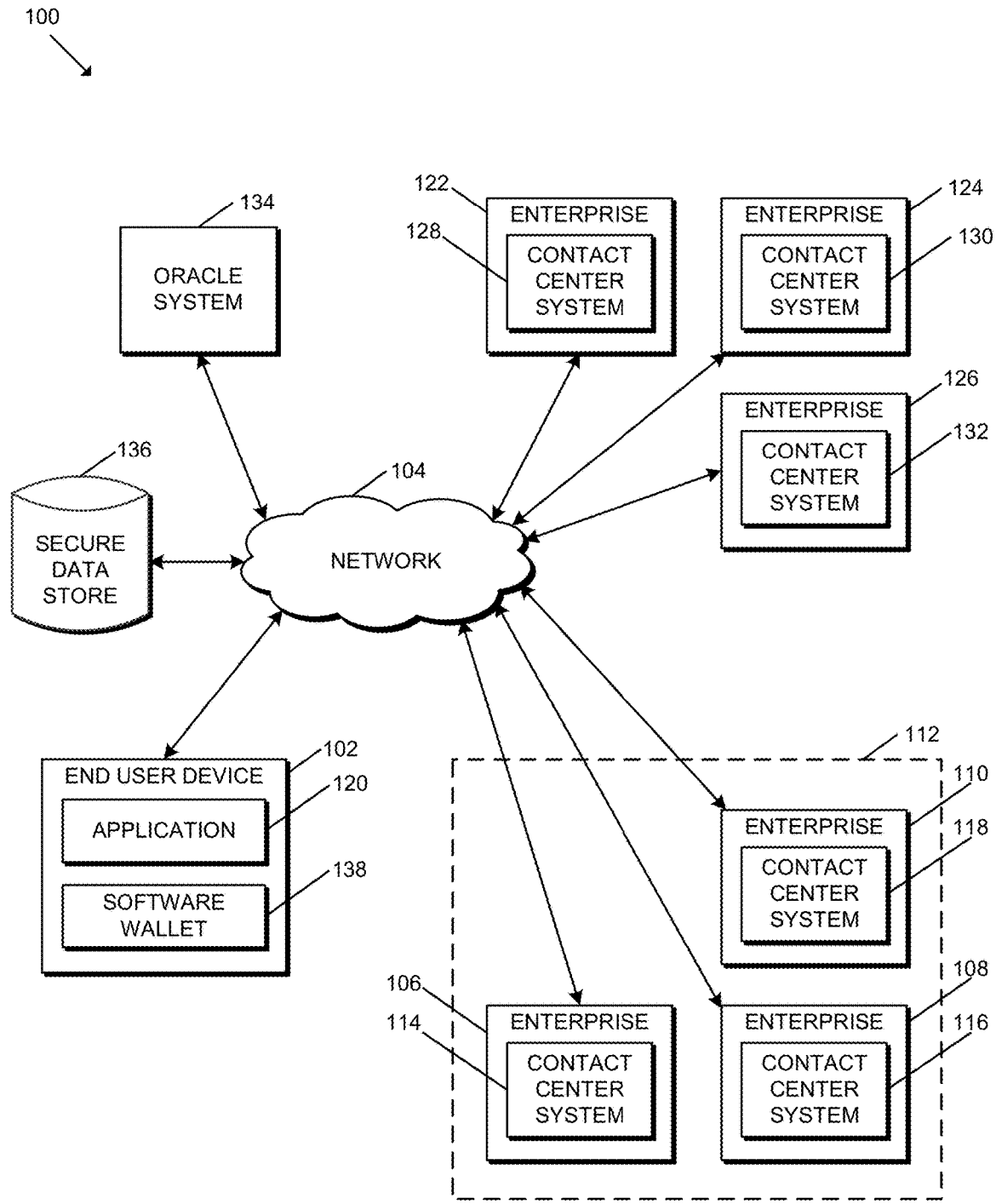
FIG. 1 is a simplified block diagram of at least one embodiment of a system for conducting a data transaction between enterprises using a permissioned blockchain infrastructure.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for conducting a data transaction between enterprises using a permissioned blockchain infrastructure includes an end user device 102, a network 104, an enterprise 106, an enterprise 108, an enterprise 110, an enterprise 122, an enterprise 124, an enterprise 126, an oracle system 134, and a secure data store 136. Additionally, in the illustrative embodiment, each of the enterprises 106, 108, 110 is included in or otherwise associated with an enterprise system 112. In some embodiments, each of the enterprises 106, 108, 110 is included in or otherwise associated with an enterprise system 112 such that each of the enterprises 106, 108, 110 may be an "on-chain" enterprise. An on-chain enterprise may be an enterprise that is within the blockchain network described in the present disclosure. In some embodiments, each of enterprises 122, 124, 126 may be "off-chain" enterprises. An off-chain enterprise may be an enterprise that is not within the blockchain network described in the present disclosure. Further, in the illustrative embodiment, the enterprise 106 includes a contact center system 114, the enterprise 108 includes a contact center system 116, the enterprise 110 includes a contact center system 118, the enterprise 122 includes a contact center system 128, the enterprise 124 includes a contact center system 130, and the enterprise 126 includes a contact center system 132. It should be appreciated that references to the enterprise 106 or the enterprise 122 herein may be made for clarity of the description and may be intended to be for illustrative purposes only. Accordingly, in some embodiments, such references to the enterprise 106 may be alternatively made with respect to the enterprise 108 or the enterprise 110 without loss of generality. Similarly, in some embodiments, such references to the enterprise 122 may be alternatively made with respect to the enterprise 124 or the enterprise 126 without loss of generality.

Although only one end user device 102, one network 104, one enterprise system 112, and one oracle system 134 are shown in the illustrative embodiment of FIG. 1, the system 100 may include multiple end user devices 102, networks 104, enterprise systems 112, and/or oracle systems 134 in other embodiments. For example, in some embodiments, multiple end user devices 102 may be used to access a web-based graphical user interface that permits end users to request data from enterprises 106, 108, 110, 122, 124, 126. Similarly, in some embodiments, the system 100 may include multiple other enterprises 106, 108, 110, 122, 124, 126 and multiple other contact center systems 114, 116, 118, 128, 130, 132. Additionally, it should be appreciated that the enterprise system 112 includes three enterprises 106, 108, 110 by way of example only, and in some embodiments, the enterprise system 112 may include a different number of enterprises. Further, in some embodiments, the contact center systems 114, 116, 118, 126, 128, 130 may be excluded from one or more of the corresponding enterprises 106, 108, 110, 122, 124, 128. For example, in some embodiments, one or more of the enterprises 106, 108, 110, 122, 124, 128 may not be associated with a contact center and, therefore, not include a contact center system.

The system 100 and technologies described herein may permit user data transfer among different enterprises (e.g., the enterprises 106, 108, 110) within an enterprise system (e.g., the enterprise system 112), which may reduce the risks and problems associated with centralized storage systems. The enterprise system 112 includes the enterprises 106, 108, 110 that may be vetted prior to being included in the enterprise system 112, which may allow the enterprises 106, 108, 110 within the enterprise system 112 to receive interoperability benefits. The permissioned blockchain infrastructure and blockchain network technologies described herein may eliminate the need for third party intermediaries to operate in between enterprises when an enterprise needs to obtain data stored by another enterprise, which also eliminates the risks associated with a third party intermediary (e.g., abuse of power, another third party gaining control over the third party intermediary, etc.). Because various consensus protocols are needed to validate a data transaction, the permissioned blockchain infrastructure and blockchain network may remove the risk of duplicate entry and/or fraud. Each data transaction occurring in the permissioned blockchain infrastructure and blockchain network may be transparent such that the enterprises 106, 108, 110 within the enterprise system 112 may view each data transaction. Therefore, the permissioned blockchain infrastructure and blockchain network technologies described herein may provide a structured, authenticated, confidential, and secured platform to use data concerning a particular end user that other enterprises possess.

Additionally, the blockchain associated with the technologies of the present disclosure may be a valuable dataset to know more about end users as well as provide personalized end user service to the end users (e.g., for contact center operations). With more data being shared about end users, the insights drawn from such data may benefit both the user/customer and the enterprise receiving the request from the end user. Further, the enterprises and the technological platform may use this data to obtain more valuable insights that may improve productivity of such enterprises. Therefore, personalization, predictive and prescriptive analysis, and automation may be unified across enterprises in an enterprise system using the permissioned blockchain infrastructure and blockchain network technologies described herein.

It should be appreciated that each of the end user device 102, network 104, enterprises 106, 108, 110, 122, 124, 126, enterprise system 112, contact center systems 114, 116, 118, 128, 130, 132, and oracle system 134 may be embodied as any type of device/system or collection of devices/systems suitable for performing the functions described herein. More specifically, in the illustrative embodiment, the end user device 102 may be a voice communications device, such as a telephone, a cellular phone, or a satellite phone. The end user device 102 alternatively may be, for example, an electronic tablet, an electronic book reader, a personal digital assistant (PDA), a portable music player, or a computer capable of communication with the enterprise 106. The end user device 102 may have various input/output devices with which a user may interact to provide and receive audio, text, video, and/or other forms of data. The end user device 102 may allow an end user to interact with the enterprise 106 (and/or other devices of the system 100) over the network 104 as described herein.

In some embodiments, the end user device 102 may be embodied as any type of device capable of executing an application and otherwise performing the functions described herein. For example, in the illustrative embodiment, the end user device 102 may be configured to execute an application 120. It should be appreciated that the application 120 may be embodied as any type of application suitable for performing the functions described herein. In particular, in some embodiments, the application 120 may be embodied as a mobile application (e.g., a smartphone application), a cloud-based application, a web application, a thin-client application, and/or another type of application. For example, in some embodiments, the application 120 may serve as a client-side interface (e.g., via a web browser) for a web-based application or service. Additionally, although only one application 120 is shown as being executed by the end user device 102, it should be appreciated that end user device 102 may be configured to execute other applications in order to perform the functions described herein.

In some embodiments, the application 120 may be an automated agent (i.e., a personal bot system) configured to automate interactions with enterprises (e.g., the enterprise 106) and/or other devices/services to achieve particular goals or results as requested by end users (e.g., a request for data) via the end user device 102. The personal bot system may be physically located in, and performed by, the end user device 102 whereas other aspects of the end user-side system may be physically located in, and executed by, a cloud computing service (e.g., the cloud computing service 230 of FIG. 2). As one example, an end user may have an issue with her cable internet service and communicate this issue to her personal bot system by speaking or typing a natural language phrase such as: "My internet connection is down. Please contact the cable company for service." A natural language refers to a language used by humans to communicate with one another (e.g., English, Spanish, French, Chinese, etc.), which is in contrast to artificial or constructed languages such as computer programming languages (e.g., C, Python, JavaScript, assembly language, etc.). The personal bot system interacts with the appropriate enterprise (e.g., the enterprise 106, which in this case, is the cable internet provider) on behalf of the end user to accomplish the end user's request (i.e., to fix the problem). During the interaction, the personal bot system may prompt the end user for additional information requested by the enterprise (e.g., a selection from a set of proposed appointment times for a technician to visit) if the personal bot system does not have access to the information, or the personal bot system may automatically respond to the question based on access to user information (e.g., appointment times may be selected through a detection of available times in the end user's calendar and preferred times specified by the end user, either as part of the request, or as part of a standing general preference).

As another example involving booking flights, when requesting information about the status of current flight reservations, an enterprise (e.g., the enterprise 106) may respond directly to the personal bot system with a list of all flights booked by the end user and associated details. However, in some embodiments, the enterprise (e.g., the enterprise 106) may request additional information based on the information in the initial request. For example, when booking a flight, the airline may respond with a list of flights available from LAX to SFO on May 19 and a list of flights available from SFO to LAX on May 24, along with flight information such as departure times, arrival times, and prices. The personal bot system may then respond to this request for more information with the selection of a particular pair of flights. Similarly, after selecting flights, the enterprise (e.g., the enterprise 106) may request the choice from among a list of available seats. Accordingly, some embodiments of the present disclosure relate to automating back-and-forth interactions between an enterprise (e.g., the enterprise 106) and a personal bot system. In some embodiments, automatic back-and-forth interactions between a personal bot system and an enterprise (e.g., the enterprise 106) allows the personal bot system to negotiate transactions with the enterprise on behalf of the end user with reduced or no involvement from the end user. In some embodiments, the personal bot system may interact with an enterprise (e.g., the enterprise 106) through various interfaces provided by the enterprise, such as APIs published by the enterprise (e.g., provided by web servers 222 of the contact center system 200 of FIG. 2) and chat bots associated with the enterprise.

In some embodiments, it should be appreciated that the personal bot system may be embodied as or include a personal bot agent. The personal bot agent may be personalized for each end user. For example, the personal bot agent may learn an end user's requirements, preferences, likes, dislikes, and data (collectively referred to herein as the "end user preferences") through the end user's use of the personal bot agent, a software wallet (e.g., the software wallet 138), and/or any other application executed by the end user device 102. By learning the end user preferences, the personal bot agent may be able to provide the best possible service, suited results, notifications, and incentives to the end user.

As shown in FIG. 1, the end user device 102 may also include or be configured to execute/manage a software wallet 138 (e.g., smart wallet) and/or application interface to such a software wallet. Accordingly, it should be appreciated that the software wallet 138 itself and/or the application capable of interfacing with the software wallet 138 may be embodied as any type of application suitable for performing the functions described herein. For simplicity and brevity of the description, it should be further appreciated that the software wallet 138 may be described herein as being an application itself. In some embodiments, the software wallet 138 may be embodied as, leverage, or rely upon a mobile application (e.g., a smartphone application), a cloud-based application, a web application, a thin-client application, and/or another type of application. For example, in some embodiments, the software wallet 138 may serve as a client-side interface (e.g., via a web browser) for a web-based application or service. Additionally, although only one software wallet 138 is shown as being included in and/or otherwise accessed by the end user device 102, it should be appreciated that end user device 102 may include and/or be configured to access multiple software wallets in some embodiments. In some embodiments, the software wallet 138 may be embodied as a component of, included in, and/or otherwise be associated with the application 120. The application 120 may provide a secure endpoint for interactions with the software wallet 138.

It should be appreciated that the software wallet 138 allows users to view their personal data (e.g., for each enterprise 106, 108, 110, 122, 124, 126 for which the user has data), create profiles based on or associated with the user data, monitor how the data is being used by the enterprises 106, 108, 110, 122, 124, 126 and/or other devices, adjust real-time permissions and/or other permissions on the data usage over the enterprises 106, 108, 110, 122, 124, 126 and/or other devices, and/or edit (e.g., add, change, delete, etc.) the various user data.

The personal bot system of the application 120 (e.g., coupled with web 3.0) may be used in conjunction with the software wallet 138 to allow users to monitor and control their data (e.g., personal data and/or enterprise-specific data). In some embodiments, the personal bot may act as an endpoint for receiving real-time permissions and authorizations from the users for enterprises 106, 108, 110, 122, 124, 126 to use their data. Further, in some embodiments, the enterprises 106, 108, 110, 122, 124, 126 may use the personal bot of the application 120 as an endpoint to reach out to the user for permission to access data and/or notifications.

In some embodiments, the user data accessible to the software wallet 138 may be stored in the secure data store 136. The secure data store 136 may be embodied as any suitable type of data storage device, component, system, and/or collection thereof capable of securely storing user data associated with the software wallet 138. For example, the secure data storage 136 may include one or more databases, data structures, and/or data storage devices capable of securely storing the software wallet data. In the illustrative embodiment, the secure data store 136 is depicted as data storage that is located remote from but accessible to the end user device 102 via the software wallet; however, in other embodiments, the end user device 102 itself may securely store the user data stored in or associated with the software wallet.

As described herein, various transactions associated with the software wallet 138 and/or otherwise, may involve the transactions being ledgered (e.g., added) to blocks within the blockchain network/infrastructure. Accordingly, the software wallet 138 allows the users to set data permission levels for the various enterprises 106, 108, 110, 122, 124, 126 and/or other devices that could potentially access the user's data. For example, in some embodiments, the permission levels of the software wallet 138 may include access or permission levels granted by a user for each relevant enterprise 106, 108, 110, 122, 124, 126 for each unit of data. In some embodiments, the permission levels may be authorized individually at the transaction level, may authorize default sharing of data (e.g., each transaction being authorized), may authorize all transactions from an enterprise 106, 108, 110, 122, 124, 126 by default for a particular period of time, and/or otherwise. Further, in some embodiments, the permission levels may identify when to revoke transaction data. Depending on the particular embodiment, it should be appreciated that the permissions may also include profile-based restrictions on use, enterprise-based restrictions on use, and/or transaction-based restrictions on use.

By way of example, Maya can set permission levels on her travel meal preferences that an enterprise (e.g., one of the enterprises 106, 108, 110, 122, 124, 126) can always view, view only after authorization, and/or never view. Based on the level of authorization that Maya has set on the travel meal preferences through her software wallet 138, the airline company may or may not receive the data. In some embodiments, Maya can check to see which enterprises have used/accessed her travel meal preferences, and her software wallet 138 will have a complete history of events that have occurred in the background, thereby providing Maya with a new level of transparency related to use of her data.

When an enterprise (e.g., the enterprise 106) needs the user's preferences (e.g., airline preferences) that are saved by a different enterprise (e.g., the enterprise 108), the enterprises may use personalized mobile applications (e.g., the application 120) to communicate with the user for access permissions to the user data, which simplifies interactions between enterprises to obtain/transfer data across enterprises. Additionally, as described herein, a similar infrastructure allows enterprises outside of the enterprise system 112 (e.g., off-chain enterprises) to interact through the blockchain, the oracle system 134, and/or APIs to obtain similar benefits. The incorporate of the software wallet 138 into the system 100 further permits another layer of data accessibility and transparency throughout the enterprise ecosystem.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108 of the system 100. It should be appreciated that the various devices/systems 102, 106, 108 may communicate with one another via different networks 104 depending on the source and/or destination devices 102, 106, 108.

The enterprises 106, 108, 110, 122, 124, 126 may be embodied as any one or more types of devices/systems that are capable of interacting with an end user and otherwise performing the functions described herein. It should be appreciated that the enterprises 106, 108, 110, 122, 124, 126 may be associated with organizations (e.g., companies) in some embodiments. The enterprises 106, 108, 110 may possess certain data and provide such data to an end user in response to a request from the end user. For example, an end user may desire to purchase airline tickets from an airline enterprise. End users may purchase plane tickets by calling an airline enterprise (e.g., the enterprise 106) to speak with a sales agent (e.g., a sales agent associated with the contact center system 114) and providing payment information over the telephone. End users may alternatively use the airline's website to search for flights and enter payment through a form in the web browser. In the illustrative embodiment, end users may interact with the contact center system 114 of enterprise 106 over the network 104 via the end user device 102.

The enterprise system 112 may be embodied as any one or more types of devices/systems that are capable of functioning as a unit and interacting via a technological platform to exchange data and other resources and otherwise performing the functions described herein. For example, in the illustrative embodiment, the enterprise system 112 may include the enterprises 106, 108, 110 and such enterprises may share data and other resources with each other. The enterprise system 112 may include other enterprises that are not shown in FIG. 1 or fewer enterprises than those shown in FIG. 1 depending on the particular embodiment. The enterprise 106 may exchange data over the network 104 with one or more of the enterprises 108, 110 in the enterprise system 112. It should be appreciated that the enterprise system 112 may be a private system, for example, in which any enterprises not included in the enterprise system 112 cannot access the technological platform without either being added to the enterprise system 112 or being given permission to access the technological platform via the enterprise system 112.

It should be further appreciated that the enterprises included in the enterprise system 112 may or may not be associated with related legal entities (e.g., subsidiary companies, daughter companies, other companies that are owned or controlled by another company such as a parent company, etc.) depending on the particular embodiment. Further, although the enterprises of the enterprise system 112 are described herein as being associated with one another (e.g., as nodes in a private system associated with a permissioned blockchain infrastructure), in other embodiments, it should be appreciated that the enterprises may be associated with one another only insofar as they are configured to communicate with the end user device 102 and/or other devices of the system 100 and otherwise perform the functions described herein.

The oracle system 134 may be embodied as any one or more types of devices/systems that are capable of connecting the blockchain network described in the present disclosure to data sources and/or resources that are "external" to the blockchain network of the present disclosure and/or otherwise performing the functions described herein. For example, in some embodiments, the oracle system 134 may connect the blockchain network (e.g., one or more of the enterprises 106, 108, 110 of the enterprise system 112) with an off-chain enterprise (e.g., one or more of the enterprises 122, 124, 126). The oracle system 134 may function as a bridge between the blockchain network and the off-chain enterprises. For example, the oracle system 134 may permit the blockchain network to receive data and/or requests from off-chain enterprises. Similarly, the oracle system 134 may permit the off-chain enterprises to receive data and/or requests from the blockchain network. APIs may be used to transmit data and/or requests to the blockchain network.

The oracle system 134 may be embodied as or include one or more automated oracles and/or one or more human oracles. In some embodiments, the one or more automated oracles may receive a data request from the blockchain network (e.g., via the enterprise 106). In response to receiving the data request, the one or more automated oracles may automatically access a data source of an off-chain enterprise (e.g., the enterprise 122). In some embodiments, the data source may be one or more off-chain enterprises (e.g., the enterprise 122), one or more off-chain databases, one or more off-chain data structures, one or more off-chain web-based APIs, and/or one or more off-chain data storage devices/systems capable of storing data or otherwise facilitating the storage of such data. The one or more automated oracles may then retrieve the requested data (e.g., from the enterprise 122) and may automatically transmit the requested data to the blockchain network (e.g., to the enterprise 106). In some embodiments, the one or more automated oracles may be communicating with one or more smart contracts of the blockchain network to perform the functions disclosed herein. The data source from which the data may be retrieved may be predetermined by one or more smart contracts of the blockchain network. Additionally or alternatively, in some embodiments, the one or more automated oracles may receive a data request from an off-chain enterprise (e.g., the enterprise 122). In response to receiving the data request, the one or more automated oracles may automatically access the requested data from the blockchain network (e.g., via the enterprise 106). The one or more automated oracles may then automatically transmit the requested data to the off-chain enterprise (e.g., to the enterprise 122).

It should be appreciated that the one or more automated oracles of the oracle system 134 may include one or more inbound automated oracles and/or one or more outbound automated oracles. For example, in some embodiments, the one or more outbound automated oracles may receive the request for data from the blockchain network (e.g., via the enterprise 106) and transmit the request for data to the data source of an off-chain enterprise (e.g., via the enterprise 122). The one or more inbound automated oracles may receive the requested data from the off-chain enterprise (e.g., via the enterprise 122) and transmit the requested data to the blockchain network (e.g., via the enterprise 106).

The one or more human oracles may include or be otherwise associated with human involvement. In some embodiments, a human oracle may be able to not only transmit deterministic data but may also respond to arbitrary requests that may not be otherwise by possible by an automated oracle. For example, human oracles may be able to provide answers to unstructured data requests. Sample dialogue may include: "Does John update his address with you"? or "Do you have John's Meal Preferences"? or "Is John's previous employment salary X?" In some embodiments, the one or more human oracles may receive the request for data from the blockchain network (e.g., via the enterprise 106) and transmit the request for data to the data source of an off-chain enterprise (e.g., via the enterprise 122). The one or more human oracles may receive the requested data from the off-chain enterprise (e.g., via the enterprise 122) and transmit the requested data to the blockchain network (e.g., via the enterprise 106).

The oracle system 134 may include or be associated with one or more single sourced oracles and/or one or more multiple sourced oracles. In some embodiments, a single sourced oracle may be an oracle that queries a single data source for data. In some embodiments, a multiple sourced oracle may be an oracle that queries more than one data source for data. For example, if the enterprises 122, 124, 126 deposit data collectively in a common data source, then the single sourced oracle may query the common data source and retrieve the data. Alternatively, if the enterprises 122, 124, 126 deposit data separately in separate data sources, then the multiple sourced oracle may query the separate data sources and retrieve and aggregate the data together. In some embodiments, retrieval of the data may generate one or more events for a smart contract to begin executing.

In some embodiments, when receiving data from an oracle system (e.g., the oracle system 134), a smart contract may depend on the truth of the requested data provided by an off-chain enterprise (e.g., via the enterprise 122), which may result in having to trust a third party and, thereby, may potentially jeopardize the benefits of a decentralized blockchain. A potential problem may occur at the data source and/or the oracle system when the trust of such data source and/or oracle system becomes compromised, which may decrease the security in the blockchain network. For example, a trustworthy oracle system may be useless if the data retrieved from a data source is incorrect. Similarly, correct data retrieved from a trustworthy data source may be useless if an oracle system does not correctly transmit the requested data to the blockchain network (e.g., to the enterprise 106).

There are various approaches that may be used to reduce the risk of untrustworthiness of an oracle system. In some embodiments, a technical framework may be used to reduce the risk of an oracle system from tampering with data. For example, a TLS notary (or a comparable digital notary functionality) may be used to sign the data during its retrieval from a data source. Additionally, a secure hardware bridge may be created between a data source and a smart contract by using software guard extensions. Further, in some embodiments, multiple oracle systems may be used (i.e., instead of one oracle system as shown in the illustrative embodiment of FIG. 1) to aggregate data in order to reduce the susceptibility of misconduct by one oracle system. In some embodiments, decentralized oracles may also be used to reduce the risk of untrustworthiness of an oracle system. By way of example, one or more of ChainLink, WitNet, Oraclize, Town Crier, and/or other technologies and implementations may be used in accordance with some of the embodiments of the present disclosure. In some embodiments, a technical framework may be used to reduce the risk of tampering of data occurring at a centralized data source. For example, in some embodiments, multiple data sources may be used in a manner in which the multiple data sources create a consensus among the data sources and aggregate the data into a single response to the request for data from an oracle system.

It should be appreciated that, in some of the embodiments described herein, the system 100 (e.g., one or more of the devices/systems thereof) may leverage one or more machine learning techniques to perform the functions described herein (e.g., for improved functionality of the user's personal bot and/or for other suitable purposes). In doing so, in some embodiments, the system 100 (e.g., one or more of the devices/system thereof) may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms.

Figure 2:
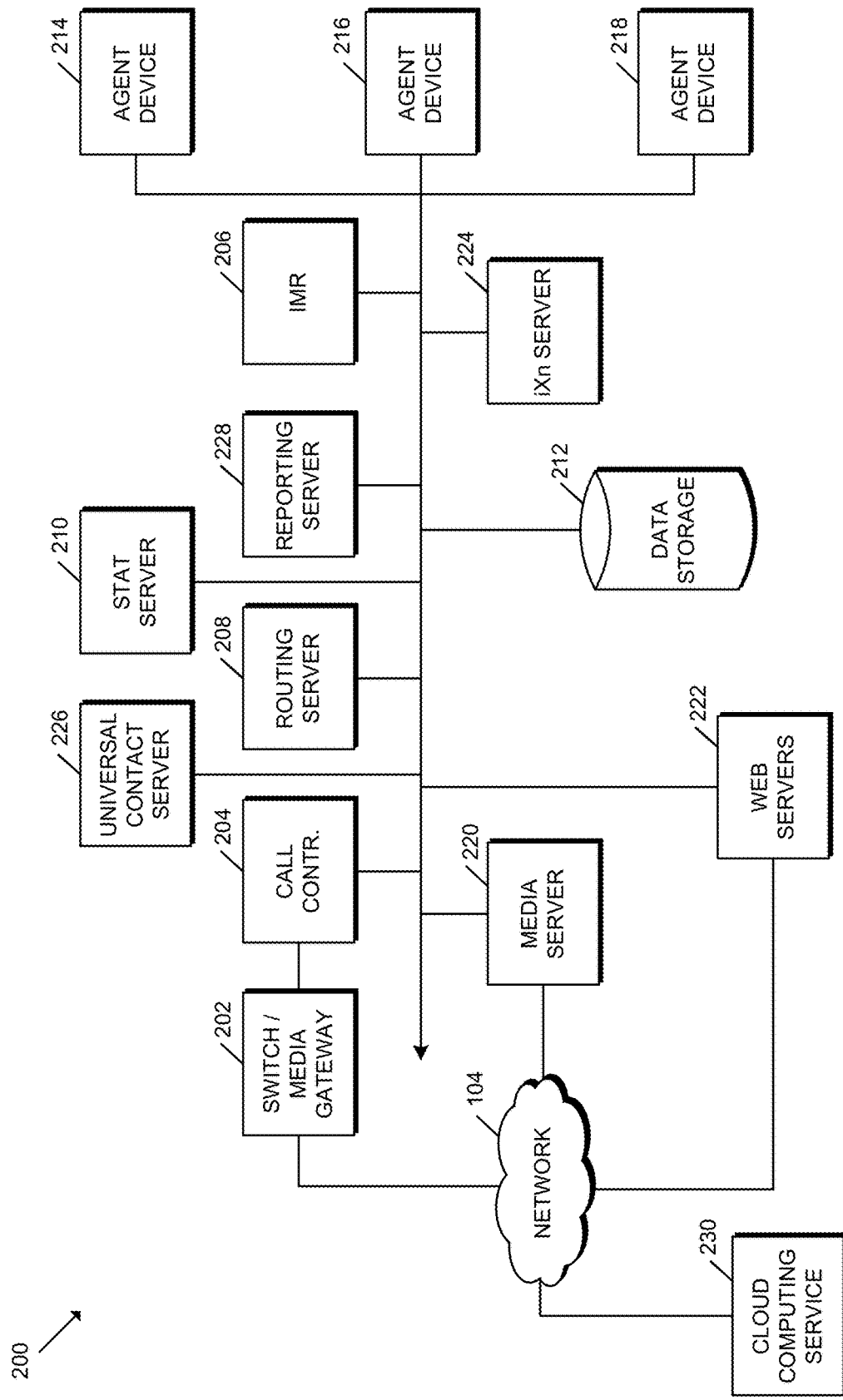
FIG. 2 is a simplified block diagram of at least one embodiment of at least one contact center system of the system of FIG. 1 for conducting a data transaction between enterprises using a permissioned blockchain infrastructure.

Referring now to FIG. 2, the contact center system 200 may be embodied as any system capable of providing contact center services (e.g., call center services, chat center services, SMS center services, etc.) to an end user and otherwise performing the functions described herein. The contact center system 200 may be illustrative of any of the contact center systems 114, 116, 118 shown in FIG. 1. Such contact center systems 114, 116, 118 may be collectively referred to herein as the contact center system 200. Depending on the particular embodiment, it should be appreciated that the contact center system 200 may be located on the premises of the enterprise utilizing the contact center system 200 and/or located remotely relative to the enterprise (e.g., in a cloud-based computing environment). In some embodiments, a portion of the contact center system 200 may be located on the enterprise's premises/campus while other portions of the contact center system 200 may be located remotely relative to the enterprise's premises/campus. As such, it should be appreciated that the contact center system 200 may be deployed in equipment dedicated to the enterprise or third-party service provider thereof and/or deployed in a remote computing environment such as, for example, a private or public cloud environment with infrastructure for supporting multiple contact centers (e.g., the contact center systems 114, 116, 118) for multiple enterprises (e.g., the enterprises 106, 108, 110). In some embodiments, the contact center system 200 includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center. The various components of the contact center system 200 may also be distributed across various geographic locations and computing environments and not necessarily contained in a single location, computing environment, or even computing device.

The illustrative contact center system 200 includes the network 104, a switch/media gateway 202, a call controller 204, an IMR server 206, a routing server 208, a stat server 210, a data storage 212, agent devices 214, 216, 218, a multimedia/social media server 220, web servers 222, an interaction (iXn) server 224, a universal contact server 226, a reporting server 228, and a cloud computing service 230. In an embodiment, the contact center system 200 may manage resources (e.g., personnel, computers, and telecommunication equipment) to enable delivery of services via telephone or other communication mechanisms. Such services may vary depending on the type of contact center and may range from customer service to help desk, emergency response, telemarketing, and/or order taking.

An end user (e.g., a customer and/or a potential customer) desiring to receive services from the contact center system 200 may initiate inbound communications (e.g., telephony calls, emails, chats, video chats, social media posts, etc.) to the contact center system 200 via the end user device 102. The switch/media gateway 202 may be embodied as any one or more types of devices/systems that are capable of performing the functions described herein. The switch/media gateway 202 may be coupled to the network 104 for receiving and transmitting telephony calls between the end user device 102 and the contact center system 200. The switch/media gateway 202 may include a telephony switch and/or communication switch configured to function as a central switch for agent level routing within the contact center system 200. The switch/media gateway 202 may be a hardware switching system or a soft switch implemented via software. For example, the switch/media gateway 202 may include an automatic call distributor, a private branch exchange (PBX), an IP-based software switch, and/or any other switch with specialized hardware and software configured to receive Internet-sourced interactions and/or telephone network-sourced interactions from the end user device 102, and route those interactions to, for example, the agent devices 214, 216, 218. In this example, the switch/media gateway 202 may establish a voice path/connection (not shown) between the end user device 102 and the agent devices 214, 216, 218, by establishing, for example, a connection between the end user device 102 and the agent devices 214, 216, 218.

In an embodiment, the switch/media gateway 202 may be coupled to a call controller 204. The call controller 204 may be embodied as any one or more types of devices/systems that are capable of performing the functions described herein. For example, the call controller 204 may serve as an adapter or interface between the switch/media gateway 202 and the remainder of the routing, monitoring, and other communication-handling components of the contact center system 200. The call controller 204 may be configured to process PSTN calls and/or VoIP calls. For example, the call controller 204 may be configured with computer-telephony integration (CTI) software for interfacing with the switch/media gateway 202 and contact center system 200 equipment. In one embodiment, the call controller 204 may include a session initiation protocol (SIP) server for processing SIP calls.

In some embodiments, the call controller 204 may, for example, extract data about the end user interaction such as the end user's telephone number (often known as the automatic number identification (ANI) number), or the end user's internet protocol (IP) address, or email address, and communicate with other contact center system 200 components in processing the interaction.

The IMR server 206 may be embodied as any one or more types of devices/systems that are capable of performing the functions described herein. For example, in some embodiments, the IMR server 206 may also be referred to herein as a self-help system or virtual assistant. The IMR server 206 may be similar to an interactive voice response (IVR) server, except that the IMR server 206 is not restricted to voice and may encompass a variety of media channels, including, for example, voice and text chat (e.g., implementing a chat bot). Considering voice as an example, however, the IMR server 206 may be configured with an IMR script for querying end users on their needs. For example, a contact center system 200 for a bank may tell end users, via the IMR script, to "press 1" if they wish to get an account balance. If this is the case, through continued interaction with the IMR server 206, end users may complete service without needing to speak with an agent. The IMR server 206 may also ask an open-ended question such as, for example, "How can I help you?" and the end user may speak or otherwise enter a reason for contacting the contact center. The end user's response may then be used by a routing server 208 to route the call or communication to an appropriate contact center resource.

If the communication is to be routed to an agent, the call controller 204 interacts with the routing server 208 (also referred to herein as an orchestration server) to find an appropriate agent for processing the interaction. The call controller 204 may be embodied as any one or more types of devices/systems that are capable of performing the functions described herein. The selection of an appropriate agent for routing an inbound interaction may be based, for example, on a routing strategy employed by the routing server 208, and further based on information about agent availability, skills, and other routing parameters provided, for example, by a statistics server 210 (also referred to herein as a stat server). The stat server 210 may be embodied as any one or more types of devices/systems that are capable of performing the functions described herein.

In some embodiments, the routing server 208 may query the data storage 212. The data storage 212 may be embodied as one or more databases, data structures, and/or data storage devices capable of storing data in the contact center system 200 or otherwise facilitating the storage of such data for the contact center system 200. For example, in some embodiments, the data storage 212 may include one or more cloud storage buckets. In some embodiments the data storage 212 may store information relating to agent data (e.g., agent profiles, and/or schedules), end user data (e.g. end user profiles, contact information, service level agreement requirements, nature of previous end user contacts and actions taken by the contact center system 200 to resolve any end user issues), and/or interaction data (e.g., details of each interaction with an end user, including reason for the interaction, disposition data, time on hold, and/or handle time). In some embodiments, some of the data (e.g., end user profile data) may be maintained in an end user relations management (CRM) database hosted in the data storage 212. The data storage 212 may also be embodied as any device or component, or collection of devices or components, capable of short-term or long-term storage of data. Although the data storage 212 is described herein as data storages and databases, it should be appreciated that the data storage 212 may include both a database (or other type of organized collection of data and structures) and data storage for the actual storage of the underlying data. The data storage 212 may store various data useful for performing the functions described herein.

After an appropriate agent is identified as being available to handle a communication, a connection may be made between the end user device 102 and agent devices 214, 216, 218 of the identified agent. The agent devices 214, 216, 218 may be embodied as any one or more types of devices/systems that are capable of performing the functions described herein. Collected information about the end user and/or the end user's historical information may also be provided to the agent devices 214, 216, 218 for aiding the agent in better servicing the communication. The agent devices 214, 216, 218 may include a telephone adapted for regular telephone calls, VoIP calls, etc. The agent devices 214, 216, 218 may also include a computer for communicating with one or more servers of the contact center system 200 and performing data processing associated with contact center operations, and for interfacing with end users via voice and other multimedia communication mechanisms.

The multimedia/social media server 220 (also referred to herein as a media server) may be embodied as any one or more types of devices/systems that are capable of performing the functions described herein. For example, in some embodiments, the multimedia/social media server 220 may engage in media interactions other than voice interactions with the end user device 102 and/or web servers 222. The media interactions may be related, for example, to email, vmail (voice mail through email), chat, video, text-messaging, web, social media, and/or co-browsing. In this regard, the multimedia/social media server 220 may take the form of any IP router conventional in the art with specialized hardware and software for receiving, processing, and forwarding multi-media events.

The web servers 222 may include, for example, social interaction site hosts for a variety of known social interaction sites to which an end user may subscribe, such as, for example, Facebook, Twitter, Instagram, etc. The web servers 222 may be embodied as any one or more types of devices/systems that are capable of performing the functions described herein. Although in the embodiment of FIG. 2 the web servers 222 are depicted as being part of the contact center system 200, the web servers 222 may also be provided by third parties and/or maintained outside of the contact center system 200 premises. The web servers 222 may also provide web pages for the enterprises 106, 108, 110 that are being supported by the contact center systems 114, 116, 118. End users may browse the web pages and get information about the products and services of the enterprises 106, 108, 110. The web pages may also provide a mechanism for contacting the contact center system 200, via, for example, web chat (e.g., with a live agent and/or with a chat bot), voice call, email, and/or WebRTC.

The web servers 222 may also provide public facing application programming interfaces (APIs) for interacting with the contact center systems 114, 116, 118 and/or the enterprises 106, 108, 110. For example, the web servers may implement APIs in accordance with the Representational State Transfer (REST) architectural style (a "RESTful" web service), where request and response payloads may be transmitted in data formats such as Extensible Markup Language (XML) or JavaScript Object Notation (JSON). As another example, the web servers may implement APIs in accordance with markup languages and/or protocols such as the Web Services Description Language (WSDL) and Simple Object Access Protocol (SOAP), or using proprietary protocols.

In addition to real-time interactions, deferrable (also referred to as back-office or offline) interactions/activities may also be routed to the agent devices 214, 216, 218. Such deferrable activities may include, for example, responding to emails, responding to letters, attending training seminars, or any other activity that does not entail real time communication with an end user. In this regard, an interaction (iXn) server 224 interacts with the routing server 208 for selecting an appropriate agent device 214, 216, 218 to handle the activity. The iXn server 224 may be embodied as any one or more types of devices/systems that are capable of performing the functions described herein. Once assigned to an agent device 214, 216, 218, an activity may be pushed to the agent, or may appear in the agent's workbin of an agent device 214, 216, 218 as a task to be completed by the agent. The agent's workbin may be implemented via any data structure conventional in the art, such as, for example, a linked list and/or array. The workbin may be maintained, for example, in buffer memory of the agent devices 214, 216, 218.

The universal contact server 226 may be embodied as any one or more types of devices/systems that are capable of performing the functions described herein. The universal contact server 226 may be configured to retrieve information stored in the CRM database and direct information to be stored in the CRM database. The universal contact server 226 may also be configured to facilitate maintaining a history of end users' preferences and interaction history, and to capture and store data regarding comments from agents and/or end user communication history.

The reporting server 228 may be embodied as any one or more types of devices/systems that are capable of performing the functions described herein. The reporting server 228 may be configured to generate reports from data aggregated by the statistics server 210. Such reports may include near real-time reports or historical reports concerning the state of resources, such as, for example, average waiting time, abandonment rate, and/or agent occupancy. The reports may be generated automatically or in response to specific requests from a requestor (e.g., agent/administrator, contact center application, etc.).

The end user device 102 and the various components of the contact center system 200 may communicate with a cloud computing service 230 (e.g., cloud computing services operated by a third party) over the network 104. The cloud computing service 230 may be embodied as any one or more types of devices/systems that are capable of performing the functions described herein. Examples of cloud computing services 230 include infrastructure as a service (IaaS) and proprietary platforms providing various particular computing services such as data storage, data feeds, and data synchronization.

In the illustrative embodiment, the contact center system 200 may be embodied as a cloud-based system executing in a cloud computing environment; however, it should be appreciated that, in other embodiments, the contact center system 200 or a portion thereof (e.g., one or more of the network 104, the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and the cloud computing service 230, and/or one or more portions thereof) may be embodied as one or more systems executing outside of a cloud computing environment.

In cloud-based embodiments, one or more of the network 104, the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and/or the cloud computing service 230 (and/or one or more portions thereof) may be embodied as a server-ambiguous computing solution, for example, that executes a plurality of instructions on-demand, contains logic to execute instructions only when prompted by a particular activity/trigger, and does not consume computing resources (or consumes nominal resources) when not in use. That is, the contact center system 200, the network 104, the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and/or the cloud computing service 230 (and/or one or more portions thereof) may be embodied as a virtual computing environment residing "on" a computing system (e.g., a distributed network of devices) in which various $3^{rd}$ party virtual functions may be executed corresponding with the functions of the contact center system 200, the network 104, the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and/or the cloud computing service 230 (and/or one or more portions thereof) described herein. For example, when an event occurs (e.g., data is transferred to the contact center system 200 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made (e.g., via an appropriate user interface to the contact center system 200), the appropriate virtual function(s) may be executed to perform the actions before eliminating the instance of the virtual function(s).

It should be appreciated that each of the end user device 102, network 104, enterprises 106, 108, 110, enterprise system 112, and contact center systems 114, 116, 118 may be embodied as (or include) one or more computing devices similar to the computing device 300 described below in reference to FIG. 3. For example, in the illustrative embodiment, each of end user device 102, network 104, enterprises 106, 108, 110, enterprise system 112, and contact center systems 114, 116, 118 may include a processing device 302 and a memory 306 having stored thereon operating logic 308 (e.g., a plurality of instructions) for execution by the processing device 302 for operation of the corresponding device.

Figure 3:
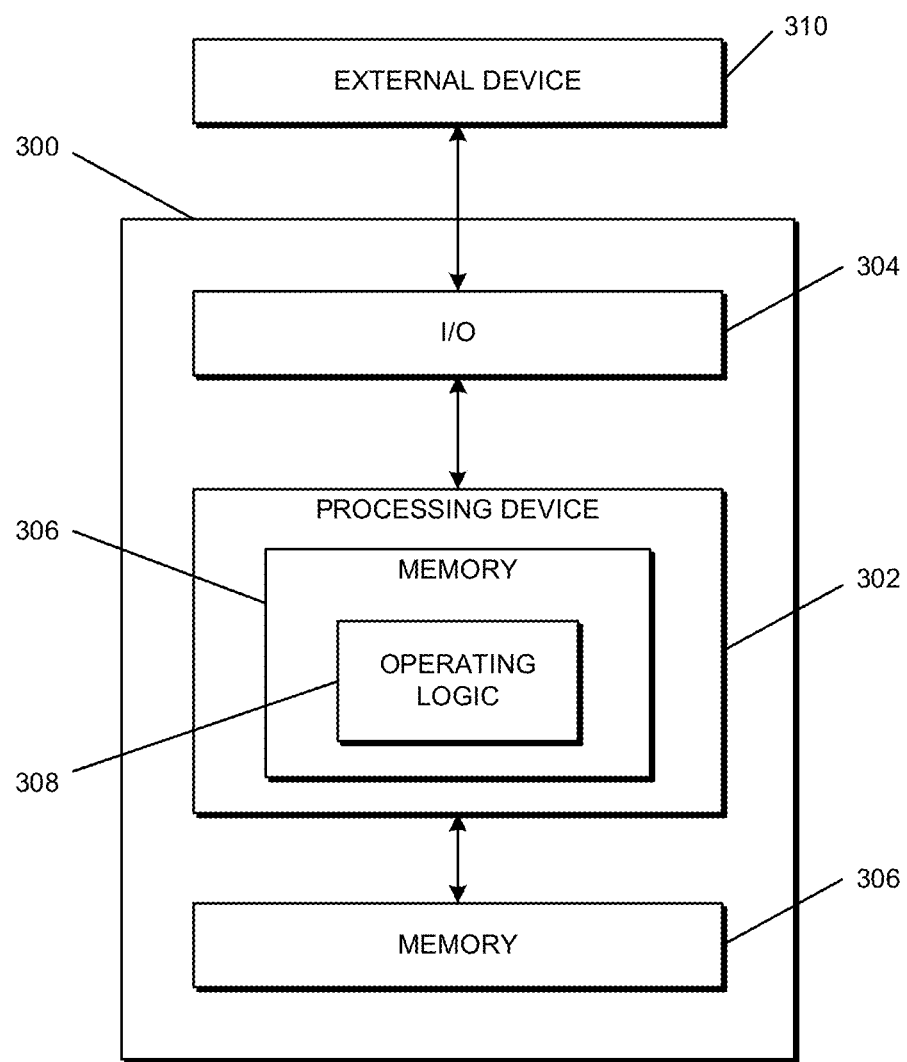
FIG. 3 is a simplified block diagram of at least one embodiment of a computing system.

Referring now to FIG. 3, a simplified block diagram of at least one embodiment of a computing device 300 is shown. The illustrative computing device 300 depicts at least one embodiment of an end user device, a network, enterprises, an enterprise system and/or a contact center system that may be utilized in connection with the end user device 102, the network 104, the enterprises 106, 108, 110, the enterprise system 112, and/or the contact center systems 114, 116, 118 illustrated in FIG. 1. Further, in some embodiments, one or more of the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and the cloud computing service 230 of FIG. 2 (and/or a portion thereof) may be embodied as or be executed by one or more computing devices similar to the computing device 300. Depending on the particular embodiment, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the end user device 102, the network 104, the enterprises 106, 108, 110, the enterprise system 112, the contact center systems 114, 116, 118, switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and/or the cloud computing service 230. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
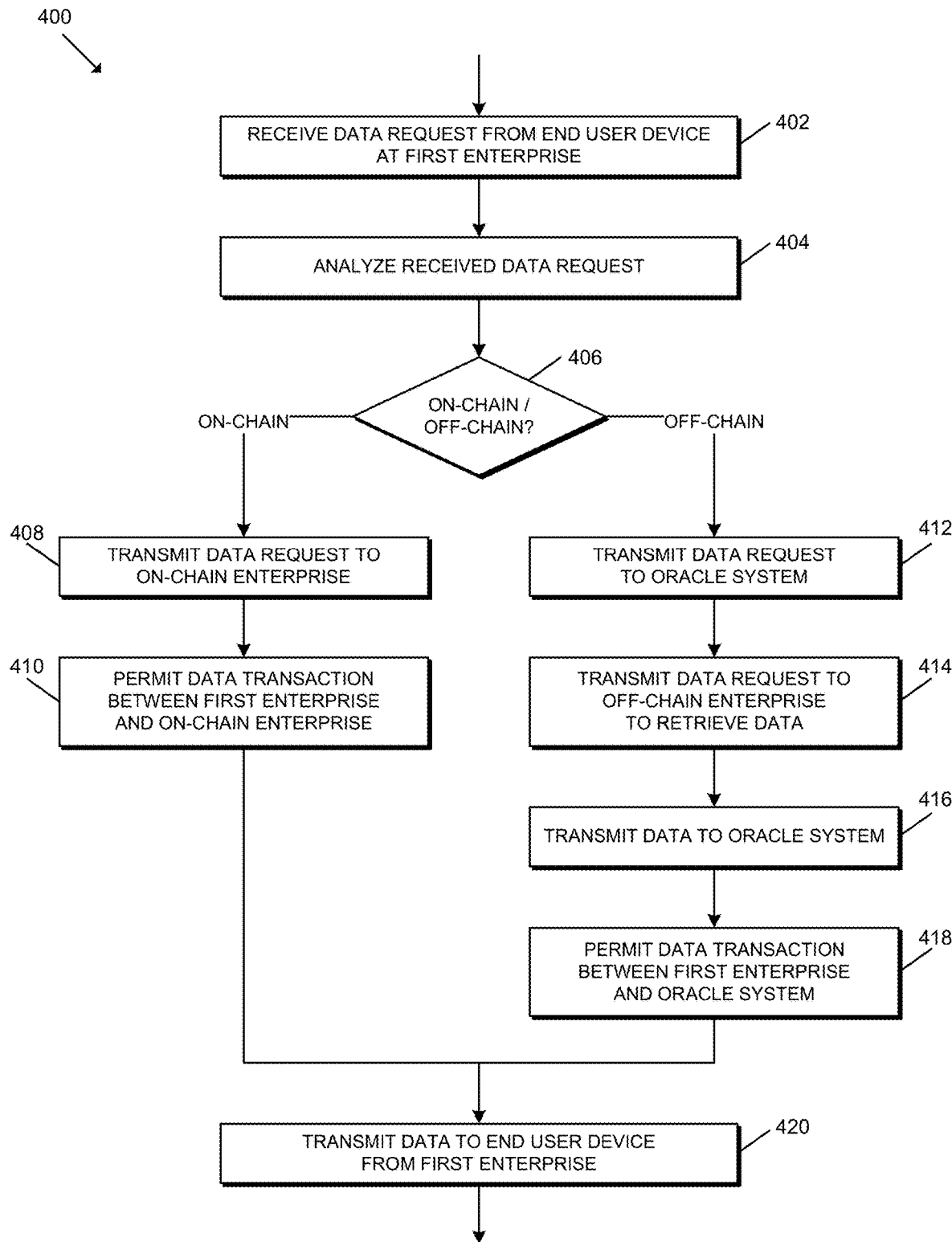
FIG. 4 is a simplified flow diagram of at least one embodiment of a method for conducting a data transaction between enterprises using a permissioned blockchain infrastructure using the system of FIG. 1.

Referring now to FIG. 4, in use, the system 100 may execute a method 400 for conducting a data transaction between enterprises using a permissioned blockchain infrastructure. It should be appreciated that the particular blocks of the method 400 are illustrated by way of example, and such blocks may be combined or divided, added or removed, and/or reordered in whole or in part depending on the particular embodiment, unless stated to the contrary. Prior to execution of the method 400, it should be appreciated that an end user may interact with the end user device 102 via a user interface of the application 120 (e.g., the personal bot system and/or a graphical user interface) in order to communicate a request for data to an enterprise (e.g., the system 100, via the enterprise 106, may receive a request for data). For example, an end user may communicate an issue with her cable internet service to an enterprise (e.g., the enterprise 106) via the application 120 (e.g., the personal bot system).

The illustrative method 400 may begin with block 402 in which the system 100 (e.g., via the enterprise 106 or, more specifically, the contact center system 114 of the enterprise 106) may receive the request for data from the end user device 102 (e.g., via the application 120 or, more particularly, the personal bot system). In some embodiments, the request for data may be generated by the end user device 102 utilizing the application 120 (e.g., the personal bot system). In some embodiments, the request for data may be generated by the end user device 102 utilizing at least one of an email, a chat, a website search, a survey feedback, a voice, or a social media conversation. In some embodiments, the end user device 102 may be an IoT device. For example, the IoT readings of an end user's air conditioner may generate an interaction with an enterprise that the end user's air conditioner compressor may have problems and may need service.

In block 404, the enterprise 106 (e.g., via the contact center system 114) may analyze the request for data and may determine that the enterprise 106 does not possess the requested data. Referring back to the cable internet service example, the enterprise 106 may determine that it does not have a solution to address the issue with the end user's cable internet service. In block 406, the enterprise 106 (e.g., via the contact center system 114) may utilize a technological platform to determine whether one or more of the enterprises 106, 108, 110 in the enterprise system 112 possesses the requested data or one or more of the enterprises 122, 124, 126 possesses the requested data. In other words, the technological platform may be leveraged (e.g., by the enterprise 106) to determine whether an on-chain enterprise (e.g., one or more of the enterprises 108, 110) or an off-chain enterprise (e.g., one or more of the enterprises 122, 124, 126) possesses the requested or desired data. If the technical platform determines that an on-chain enterprise (e.g., one or more of the enterprises 108, 110 in the enterprise system 112) possesses the requested data, the method 400 may advance to block 408 in which the technological platform may communicate to the enterprise 106 information regarding the enterprise possessing the requested data (e.g., the enterprise 108). For example, the technological platform may determine that enterprise 108 possesses the solution to address the issue with the end user's cable internet service. The enterprise 106 (e.g., via the contact center system 114) may then transmit the request for data to the enterprise 108.

In block 410, the system 100 may permit a data transaction between the enterprise 106 (e.g., via the contact center system 114) and the enterprise 108 (e.g., via the contact center system 116) utilizing a permissioned blockchain infrastructure. For example, the enterprise 108 may share with the enterprise 106 the solution to address the issue with the end user's cable internet service. In some embodiments, the system 100 may execute the method 500 of FIG. 5 (or a portion thereof) as described in detail below in association with the method 400 of FIG. 4.

It should be appreciated that a blockchain may refer to a suite of distributed ledger technologies that can be programmed to record and track the data transactions of the present disclosure. The blockchain is a combination of three technologies, including cryptography, a peer-to-peer network, and a governance structure. The blockchain may store data in batches, called blocks, which are linked together in a chronological manner to form a continuous "chain" of blocks. If a change occurs to the data recorded in a particular block, the change may be stored in a new block showing the change at a particular date and time (e.g., "X changed to Y on 8/23/2020 at 10:45 AM EDT"). The blockchain may be decentralized and distributed across a network of nodes. The decentralizing of data may reduce the ability for data tampering. Each enterprise within the blockchain network (e.g., within the system 100) may maintain, approve, and update new blocks.

The blockchain governance elements may be categorized into four elements, including, the consensus algorithm, incentives, information, and governing structure. For example, the blockchain network may leverage one or more consensus algorithms to execute the data transaction verification within the blockchain network. Consensus may be a method of reaching agreement among the different nodes on the blockchain network. Different blockchain systems may implement different consensus algorithms which can benefit the entities that validate new data transactions and record the transactions on the blockchain (i.e., the miners) directly or indirectly. For example, in some embodiments, the blockchain network may utilize a proof of work algorithm, a delayed proof of work algorithm, a proof of stake algorithm, a delegated proof of stake algorithm, a leased proof of stake algorithm, a proof of stake velocity algorithm, a proof of elapsed time algorithm, a practical Byzantine fault tolerance algorithm, a simplified Byzantine fault tolerance algorithm, a delegated Byzantine fault tolerance algorithm, a proof of activity algorithm, a proof of authority algorithm, a proof of reputation algorithm, a proof of history algorithm, a proof of importance algorithm, a proof of capacity algorithm, a proof of burn algorithm, a proof of weight algorithm, and/or other suitable consensus algorithms, techniques, and/or mechanisms.

Incentives may permit the different entities (e.g., miners, etc.) to help run the blockchain by providing nodes incentives for their actions. There may be an incentive for every entity that is participating in the functionality of the network. Information may also be critical to the blockchain. As the blockchain is decentralized, considerable amounts of information may need to be in the blockchain network.

The blockchain governance structure may ensure that the blockchain can function efficiently and seamlessly while in active development by developers. The blockchain governance may rely on four central communities to manage the blockchain governance, including the core developers, the node operators, the token holders, and the blockchain team. The core developers may be responsible for developing, managing, and maintaining the core code of the blockchain. The core developers may write, update, or remove code that has a direct impact on the blockchain's functionality and, thereby, can impact every enterprise in the blockchain network. The node operators may be responsible for carrying the blockchain ledger full copy. The node operators may run operations from their computers and are responsible for deciding whether features will run on nodes or not. The node operators may also provide storage and computation for the blockchain operations. Code developers may need to consult the node operators before the code developers decide on any features. The token holders may be the enterprises that are part of the blockchain network by holding blockchain tokens. Token holders may take part in the governance through voting rights when changes are made to the blockchain, including, for example, feature changes and set prices. In certain embodiments, token holders may also be investors having a certain token percentage that affects their voting position. The blockchain team may be an enterprise that has different roles to manage the blockchain, including, for example, funding, negotiation, and communication. The blockchain team may act as a mediator to negotiate for features between the token holders, the core developers, and node operators.

The permissioned blockchain infrastructure and the blockchain network of the present disclosure may require access to be part of the infrastructure and network. A control layer may run on top of the blockchain that governs the actions performed by the allowed enterprises. Compared to a public blockchain infrastructure, the permissioned blockchain infrastructure may offer better performance because of the limited number of nodes included in the infrastructure, which may remove unnecessary computations required to reach consensus in the infrastructure. Additionally, the permissioned blockchain infrastructure may include its own pre-determined nodes for validating the data transaction. In contrast to a public blockchain, the permissioned blockchain infrastructure may include a governance structure that requires less time to update the rules over the blockchain network. For example, the nodes included in the permissioned blockchain infrastructure may work together to accomplish updates over the blockchain faster than the nodes in a public blockchain that may work in opposition of each other. The permissioned blockchain infrastructure of the present disclosure may also restrict the consensus participants making a permissioned blockchain network highly configured and controlled by the enterprises in the network. The permissioned blockchain infrastructure of the present disclosure may enable a data transaction among enterprises (e.g., the enterprises 106, 108, 110) in the enterprise system 112.

Referring back to block 406, if the technical platform determines that an off-chain enterprise (e.g., one or more of the enterprises 122, 124, 126) possesses the requested data, the method 400 may advance to block 412 in which the technological platform may communicate to the oracle system 134 information regarding the enterprise possessing the requested data (e.g., the enterprise 122). For example, the technological platform may determine that the enterprise 122 possesses the solution to address the issue with the end user's cable internet service. The enterprise 106 (e.g., via the contact center system 114) may then transmit the request for data to the oracle system 134. In block 414, the oracle system 134 may transmit the request for data to the enterprise 122. In block 416, the enterprise 122 may transmit the requested data to the oracle system 134. In block 418, the system 100 may permit a data transaction between the enterprise 106 (e.g., via the contact center system 114) and the oracle system 134 utilizing a permissioned blockchain infrastructure. For example, the oracle 134 may share with the enterprise 106 the solution to address the issue with the end user's cable internet service. In some embodiments, the system 100 may execute the method 500 of FIG. 5 (or a portion thereof) as described in detail below in association with the method 400 of FIG. 4.

In block 420, the system 100 (e.g., via the enterprise 106) may transmit the requested data received from the enterprise 108 or the oracle system 134 to the end user device 102 (e.g., via the application 120 or, more particularly, the personal bot system). For example, the enterprise 106 may share with the end user device 102 the solution to address the issue with the end user's cable internet service.

Although the blocks 402-420 are described in a relatively serial manner, it should be appreciated that various blocks of the method 400 may be performed in parallel in some embodiments.

Figure 5:
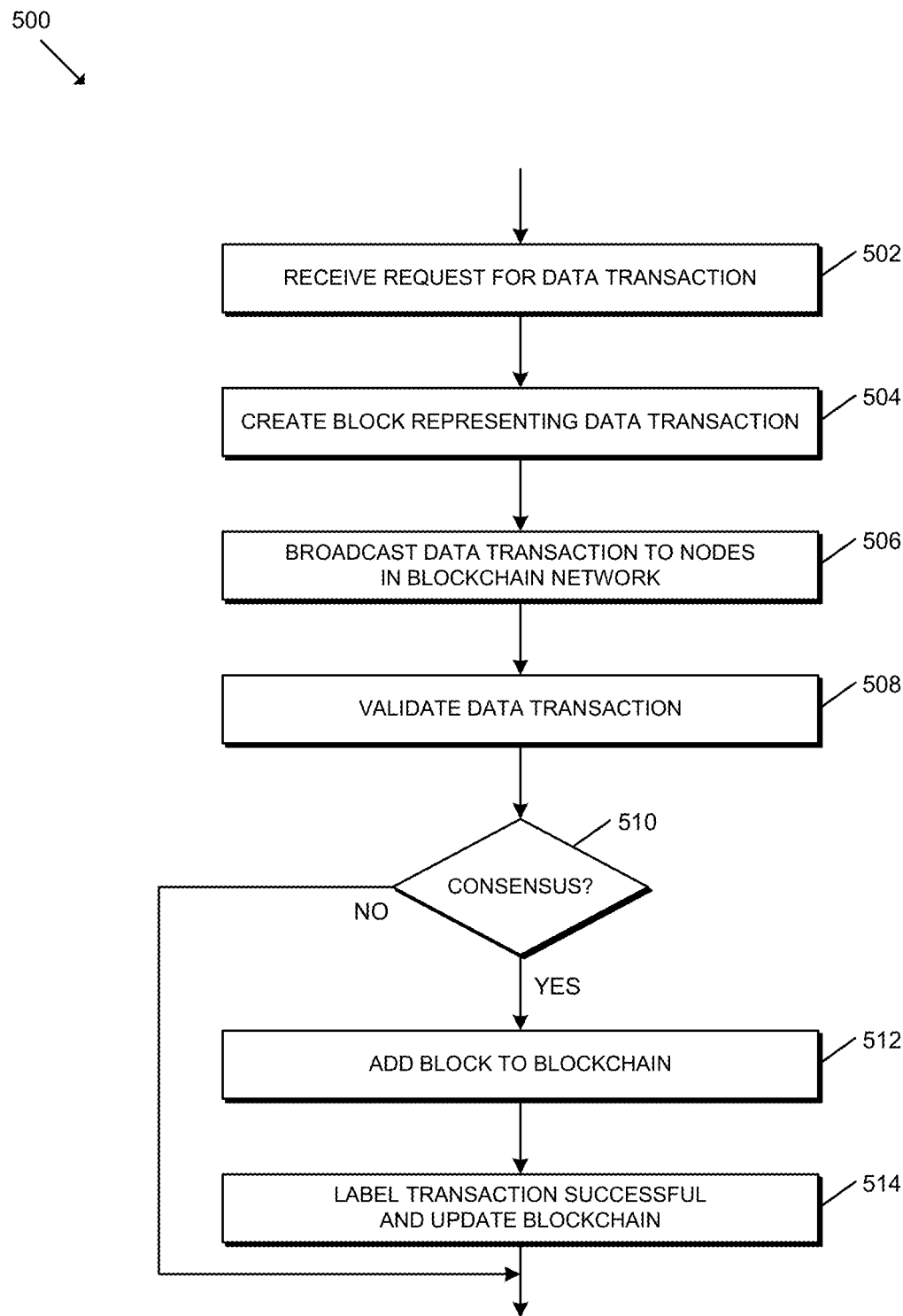
FIG. 5 is a simplified flow diagram of at least one embodiment of a method for conducting a data transaction between enterprises using a permissioned blockchain infrastructure using the system of FIG. 1.

Referring now to FIG. 5, in use, the system 100 may execute a method 500 for conducting a data transaction between enterprises using a permissioned blockchain infrastructure. It should be appreciated that the particular blocks of the method 500 are illustrated by way of example, and such blocks may be combined or divided, added or removed, and/or reordered in whole or in part depending on the particular embodiment, unless stated to the contrary. Prior to execution of the method 500, it should be appreciated that an end user may interact with the end user device 102 via a user interface of the application 120 (e.g., the personal bot system and/or a graphical user interface) in order to communicate a request for data to an enterprise (e.g., the system 100, via the end user device 102, may receive a request for data).

The system 100 (e.g., via the enterprise 106 or, more specifically in some embodiments, the contact center system 114 of the enterprise 106) may receive the request for data from the end user device 102 (e.g., via the application 120 or, more particularly, the personal bot system). The enterprise 106 (e.g., via the contact center system 114) may analyze the request for data, may determine that the enterprise 106 does not possess the requested data, may determine that enterprise 108 possesses the requested data among the enterprises included in the enterprise system, and may transmit the request for data to the enterprise 108. It should be that the system 100 may utilize any suitable blockchain technology to perform the method 500 of FIG. 5 and, therefore, one or more of the blocks of the method 500 may be varied based on aspects associated with the particular blockchain technology.

The illustrative method 500 begins with block 502 in which the system 100 (e.g., via the enterprise 108 or, more specifically, the contact center system 116) may receive a request for a data transaction from an enterprise (e.g., via the enterprise 106 or, more specifically, the contact center system 114). A node may initiate a data transaction and may sign the data transaction with its private key. In some embodiments, a node may be a computing device 300. Nodes may form the infrastructure of the blockchain. For example, the nodes on the blockchain may be connected to each other and may constantly exchange the latest blockchain data. In some embodiments, the nodes may store, transmit, and preserve the blockchain data. In some embodiments, the private key may generate a unique digital signature ensuring that no entity can alter the signature.

In block 504, a block representing the data transaction may be created in the blockchain network. In block 506, the data transaction may be published to each node in the blockchain network. In block 508, each node in the blockchain network may verify whether the data transaction is valid or not (i.e., validate the data transaction). In some embodiments, the nodes in the blockchain network may use one or more consensus algorithms to validate the transaction. For example, the nodes in the blockchain network may use one or more of the suitable consensus algorithms, techniques, and/or mechanisms described above in reference to the method 400 of FIG. 4. In block 510, the blockchain network may determine whether consensus has been reached among the nodes in the blockchain network. If the blockchain network determines that consensus has been reached among the nodes in the blockchain network, the method 500 may advance to block 512 in which the blockchain network may add the block to the blockchain. The block may include a timestamp and unique identification to secure the block from alteration. If the blockchain network determines that consensus has not been reached among the nodes in the blockchain network, the method 500 may terminate (e.g., such that the data transaction will be unsuccessful). In block 514, the blockchain network may label the data transaction as successful and update each node in the blockchain network with the block (e.g., the requested data may be provided to the enterprise 106 by the enterprise 108). When the block is added to the blockchain, the block may link itself to the previous block in the blockchain. When the next new block arrives at the blockchain network, the next new block will cryptographically link itself to the block added in block 512 of FIG. 5.

Although the blocks 502-514 are described in a relatively serial manner, it should be appreciated that various blocks of the method 500 may be performed in parallel in some embodiments. After execution of the method 500, it should be appreciated that the system 100 (e.g., via the enterprise 106) may transmit the requested data received from the enterprise 108 to end user device 102 (e.g., via the application 120 or, more particularly, the personal bot system).

Figure 6:
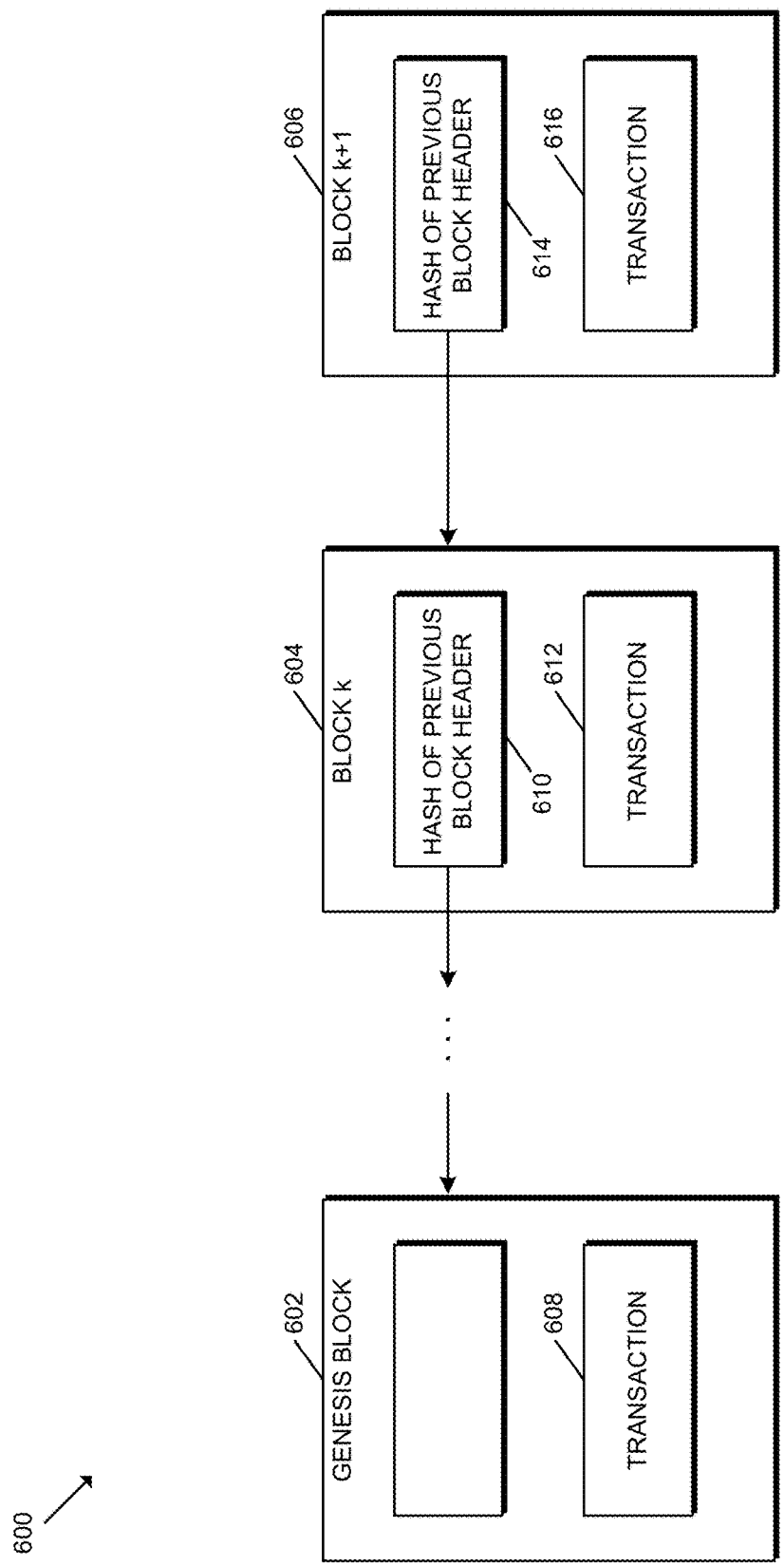
FIGS. 6-7 are simplified block diagrams of at least one embodiment of a blockchain architecture.

Referring now to FIG. 6, a blockchain architecture includes a partial blockchain 600 including a genesis block 602, a block k 604, and a block k+1 606. It should be appreciated that the blocks 602, 604, 606 illustrated in the blockchain 600 may include only a portion of the full blockchain 600, such that one or more additional blocks may be included between the genesis block 602 and the block k 604 (e.g., represented by the ellipsis). If the blockchain 600 includes only the three blocks 602, 604, 606, then the genesis block 602 may also be described as the block k−1. As described herein, blockchains (e.g., the blockchain 600) includes transactions that are recorded/saved to the respective blocks and ordered in chronological order. As such, the blocks of the blockchain 600 may be timestamped.

Each of the blocks in the illustrative blockchain 600 includes a transaction and a hash of the previous block's header (e.g., previous block to be added to the blockchain 600 chronologically). For example, the genesis block 602 includes the transaction 608, the block k 604 includes a hash 610 of the previous block header (i.e., the header of block k−1, not shown) and a transaction 612, and the block k+1 606 includes a hash 614 of the previous block header (i.e., the header of the block k 604) and a transaction 616. Because the genesis block 602 is the first block on the blockchain 600 and therefore not "linked" to a previous block on the blockchain 600, the genesis block 602 does not include a hash of a previous block header. Instead, in some embodiments, the location on the block reserved for the hash of the previous block header may be set to zero (or another predefined value) on the genesis block 602.

It should be appreciated that the transactions of the blockchain 600 (e.g., the transactions 608, 612, 616, etc.) may record various interactions and/or events occurring within the system 100. For example, such interactions/events may include interactions between an end user (or other person) and an enterprise 106, 108, 110, interactions between the various enterprises 106, 108, 110 within the system, events occurring within a particular enterprise 106, 108, 110, and/or other relevant interactions/events within the system 100. By way of example, one or more of the transactions may include data indicating that an end user (e.g., customer) reported a loss of network connection with an internet service provider, an end user booked an international trip to another country, an end user provided feedback regarding satisfaction with a particular enterprise agent, an end user shared specific preferences with an enterprise 106, 108, 110 (e.g., an airline), an enterprise 106, 108, 110 shared data (e.g., user data) with another enterprise 106, 108, 110, an enterprise 106, 108, 110 saved new interests about an end user or other person, and/or other relevant information.

It should be appreciated that the data transfer and/or interactions may be initiated by an end user's interaction with personal bots, various enterprise touch points (e.g., email chat, website searches, survey feedback, phone, messengers, applications, social media conversations, etc.), end user IoT device data/activity (e.g., an IoT device indicating that mechanical equipment may need service), and/or otherwise.

Figure 7:
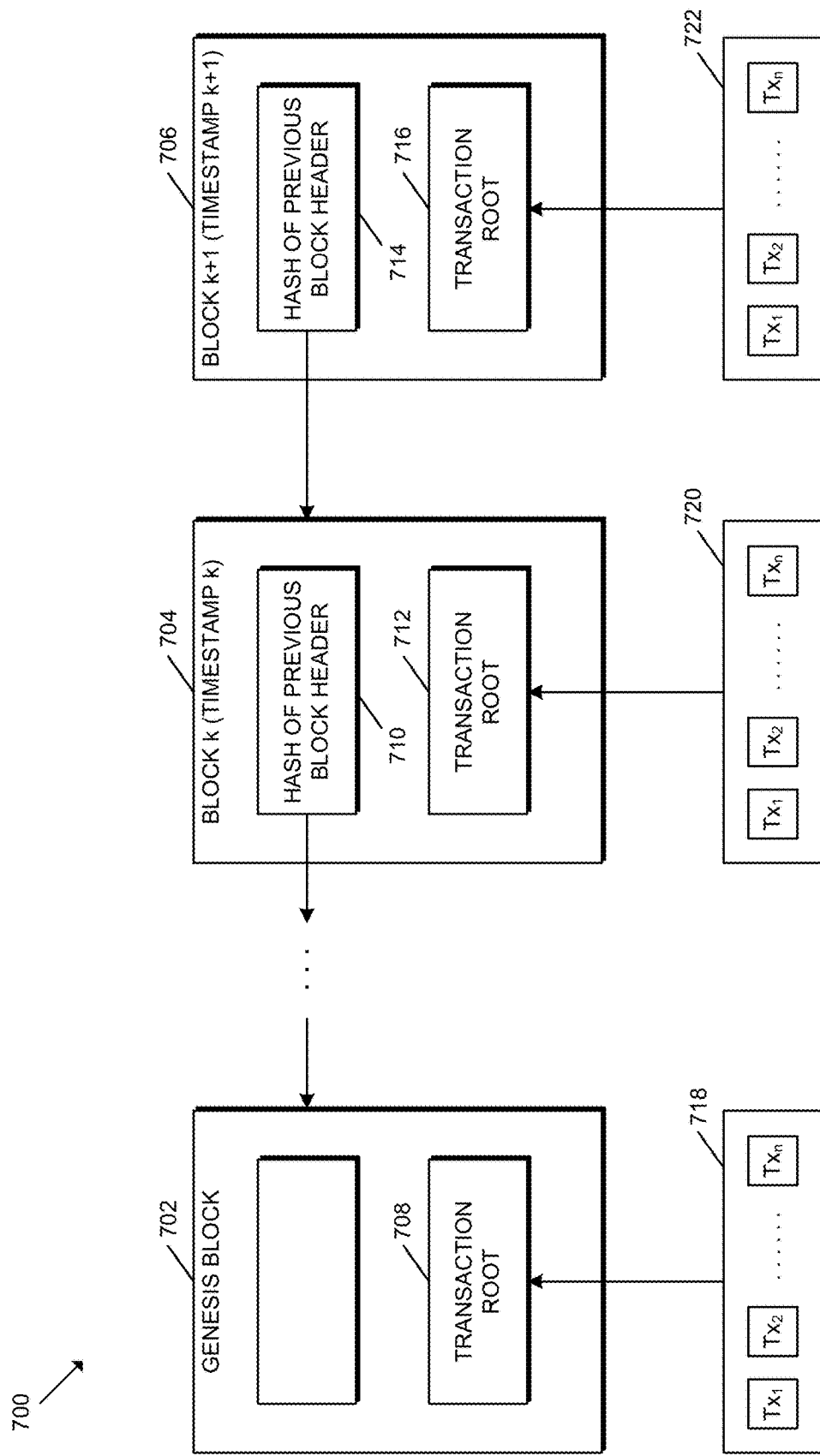

Referring now to FIG. 7, a blockchain architecture includes a partial blockchain 700 including a genesis block 702, a block k 704, and a block k+1 706. It should be appreciated that the blocks 702, 704, 706 illustrated in the blockchain 700 may include only a portion of the full blockchain 700, such that one or more additional blocks may be included between the genesis block 702 and the block k 704 (e.g., represented by the ellipsis). If the blockchain 700 includes only the three blocks 702, 704, 706, then the genesis block 702 may also be described as the block k−1.

Each of the blocks in the illustrative blockchain 700 includes a transaction root and a hash of the previous block's header (e.g., previous block to be added to the blockchain 700 chronologically). For example, the genesis block 702 includes the transaction root 708, the block k 704 includes a hash 710 of the previous block header (i.e., the header of block k−1, not shown) and a transaction root 712, and the block k+1 706 includes a hash 714 of the previous block header (i.e., the header of the block k 704) and a transaction root 716. Because the genesis block 702 is the first block on the blockchain 700 and therefore not "linked" to a previous block on the blockchain 700, the genesis block 702 does not include a hash of a previous block header. Instead, in some embodiments, the location on the block reserved for the hash of the previous block header may be set to zero (or another predefined value) on the genesis block 702.

It should be appreciated that multiple transactions may be stored to a particular block of a blockchain (e.g., the blockchain 700) in some embodiments. For example, as depicted in FIG. 7, the blockchain 700 includes transactions 718 ($T_{X_1}, T_{X_2}, \ldots, T_{X_n}$) included in or otherwise linked to the transaction root 708 of the genesis block 702, transactions 720 ($T_{X_1}, T_{X_2}, \ldots, T_{X_n}$) included in or otherwise linked to the transaction root 712 of the block 704 (with timestamp k), and transactions 722 ($T_{X_1}, T_{X_2}, \ldots, T_{X_n}$) included in or otherwise linked to the transaction root 716 of block (with timestamp k+1). In particular, in some embodiments, a blockchain (e.g., the blockchain 700) may group transactions based on the interval/timestamp as Merkle trees within a block. For example, the transactions 720 may include all transactions (or all of a particular type of transaction) between timestamps i−1 and i, and the transactions 722 may include all transactions (or all of a particular type of transaction) between timestamps i and i+1. Further, in some embodiments, the transactions may be grouped based on the customer/user identity. For example, a particular block may record all transactions related to a particular customer/user occurring between two timestamps. Such implementations may serve to save space and still preserve the authenticity of transactions in each block.

In some embodiments, the blockchains described herein may include smart contracts, which the system 100 may leverage to self-execute and perform various functions (e.g., automated transact across enterprise devices in the system 100). It should be appreciated that a smart contract may be embodied as computer-executable code stored in a blockchain and configured to self-execute by the nodes of the blockchain system based on various conditions/terms defined by the respective smart contract. Accordingly, smart contracts may be stored to a blockchain and executed by the blockchain nodes automatically and without discretion of the nodes, and the smart contract is therefore distributed and immutable. The particular conditions/terms associated with execution of various functions can be anything depending on the particular smart contract and context of the relationships involved. The smart contracts may be executing on each of the nodes in the blockchain network continuously to monitor for the satisfaction of the various conditions described therein, and may involve primitive and/or sophisticated tasks depending on the particular embodiment. In some embodiments, a data sharing scenario may involve a data requestor (e.g., the enterprise that needs some specific customer/user data), a data provider (e.g., the enterprise that "owns" the required data), and a transaction facilitator (e.g., an entity/person that writes smart contracts over a permissioned blockchain or non-permissioned blockchain). It should be appreciated that the system 100 may the blockchain architectures of FIGS. 6-7 may be used in conjunction with one or more of the techniques described herein.

Figure 8:
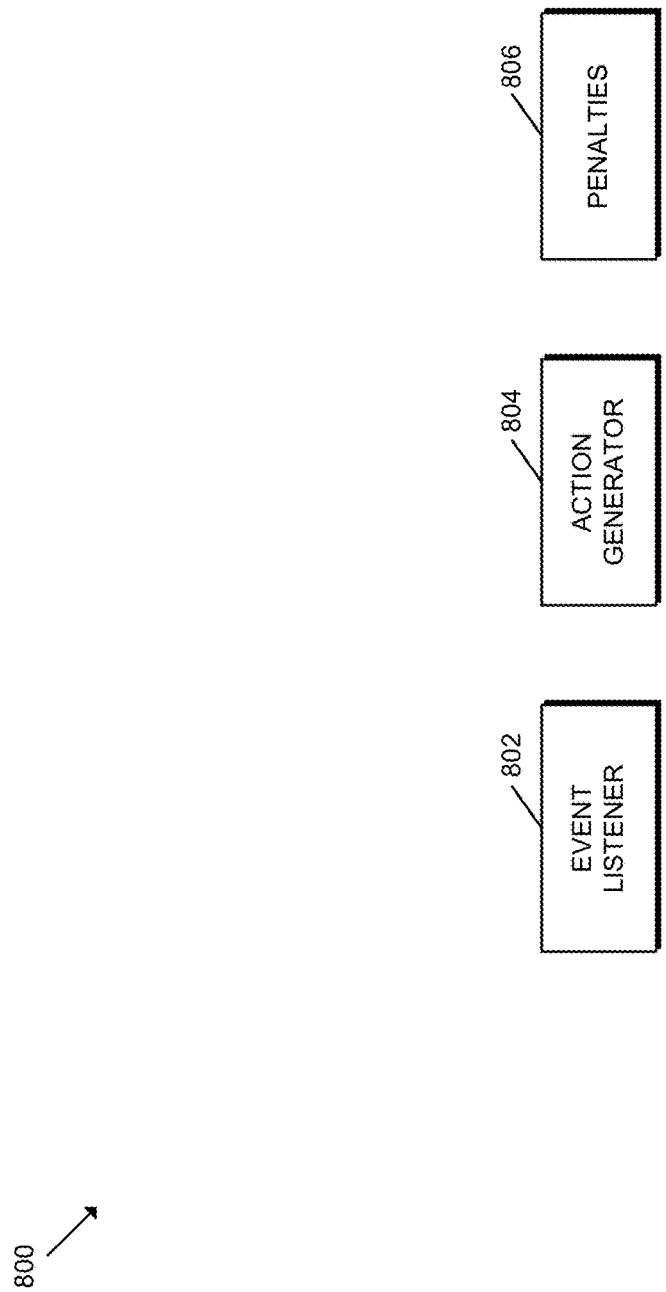
FIG. 8 is a simplified block diagram of at least one embodiment of a smart contract architecture.

Referring now to FIG. 8, a smart contract architecture 800 includes an event listener 802, an action generator 804, and penalties 806. As described above, smart contracts may be added to blockchains in order to automatically monitor various conditions and perform various functions. In some embodiments, a smart contract may be described as self-executing computer-executable code that includes conditions that are monitored and actions performed based on the evaluation of those conditions. In particular, the event listener 802 may listen to the underlying blockchain for one or more particular events to occur and, if so, the action generator 804 causes one or more corresponding actions to execute (e.g., with respect to the blockchain and/or otherwise). In some embodiments, the event listener 802 may determine that one or more penalties 806 should be imposed/enforced in which case penalty code may be automatically executed to enforce the penalties. Although the smart contract architecture 800 includes penalties 806, in some embodiments, a particular smart contract may not include any penalties.

Figure 9:
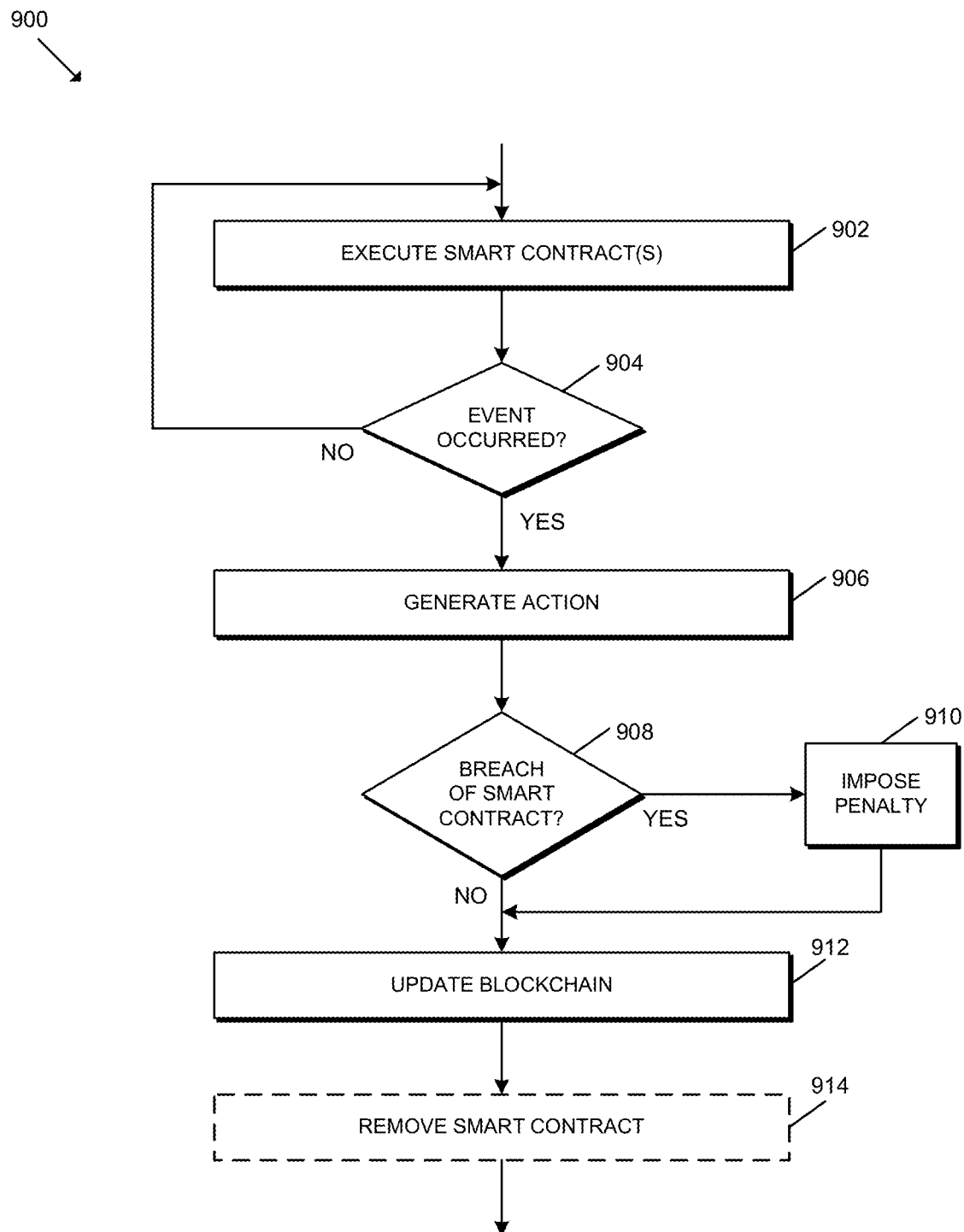
FIG. 9 is a simplified flow diagram of at least one embodiment of a method for conducting a data transaction between enterprises using a smart contract.

Referring now to FIG. 9, in use, the system 100 may execute a method 900 for conducting a data transaction between enterprises using a smart contract. It should be appreciated that the particular blocks of the method 900 are illustrated by way of example, and such blocks may be combined or divided, added or removed, and/or reordered in whole or in part depending on the particular embodiment, unless stated to the contrary.

The method 900 begins with block 902 in which the system 100 or, more specifically, a particular node of the blockchain network executes one or more smart contracts stored on a blockchain. For example, in some embodiments, each of the nodes of the blockchain network may automatically and indiscriminately execute each of the smart contracts to ensure that the terms of the smart contracts are self-executing, distributed, and immutable. As described above, the smart contracts may include one or more events that result in the performance of various actions. Accordingly, if the node determines in block 904 that such an event has occurred, the method 900 advances to block 906 in which the smart contract (or more precisely the node executing the smart contract) executed an action associated with the event occurrence.

As described above, in some embodiments, the smart contracts may identify various penalties associated with the occurrence of a particular event (e.g., breach of the smart contract). Accordingly, if the smart contract (or more precisely the node executing the smart contract) determines in block 908 that breach of the smart contract has occurred (e.g., satisfaction of a condition resulting in penalties), the method 900 advances to block 910 in which one or more penalties are imposed. In block 912, the node (and other nodes also executing the smart contracts) updates the blockchain. In some embodiments, in block 914, one or more conditions may result in the smart contract being removed or disabled from the blockchain (e.g., via self-destruction).

Although the blocks 902-914 are described in a relatively serial manner, it should be appreciated that various blocks of the method 900 may be performed in parallel in some embodiments. For example, in some embodiments, the smart contract monitors for multiple conditions in parallel, including the occurrence of conditions that would constitute breach of the smart contract and/or otherwise impose penalties.

By way of example, suppose a customer, John, updates his address in his last interaction with First Bank. The interaction's insight may reach the blockchain. As such, the event listener of a smart contract may detect the event and from the code, identify the appropriate action to be triggered. For example, the action may be a subsequent interaction with Second Bank where John also holds an account in order to also update his address there. The execution of the smart contract may cause an interaction to be triggered between First Bank and Second Bank to share John's updated address and, once authenticated and approved, Second Bank may gain access to data owned by First Bank (e.g., including or limited to John's updated address) and change the address in its systems as well. As a follow-up, the smart contract may include code to notify John of the successful transaction, and the update may be published to the blockchain.

As another example, John may trigger an interaction with Airline to book a flight for a business trip. As before, the interaction's insight may reach the blockchain, and the event listener may detect the event and trigger and automatic interaction with Airline indicating that John's meal preferences may be obtained from Credit Card Company. Upon approval by Airline, an interaction with Credit Card Company may be automatically triggered to request John's international travel meal preferences. If agreed and validated, Airline may immediately gain access to the meal preferences in Credit Card Company's data regarding John, and it may update its own data. The transaction may be added to the blockchain and, in some embodiments, John may be notified of the successful transaction.

Figure 10:
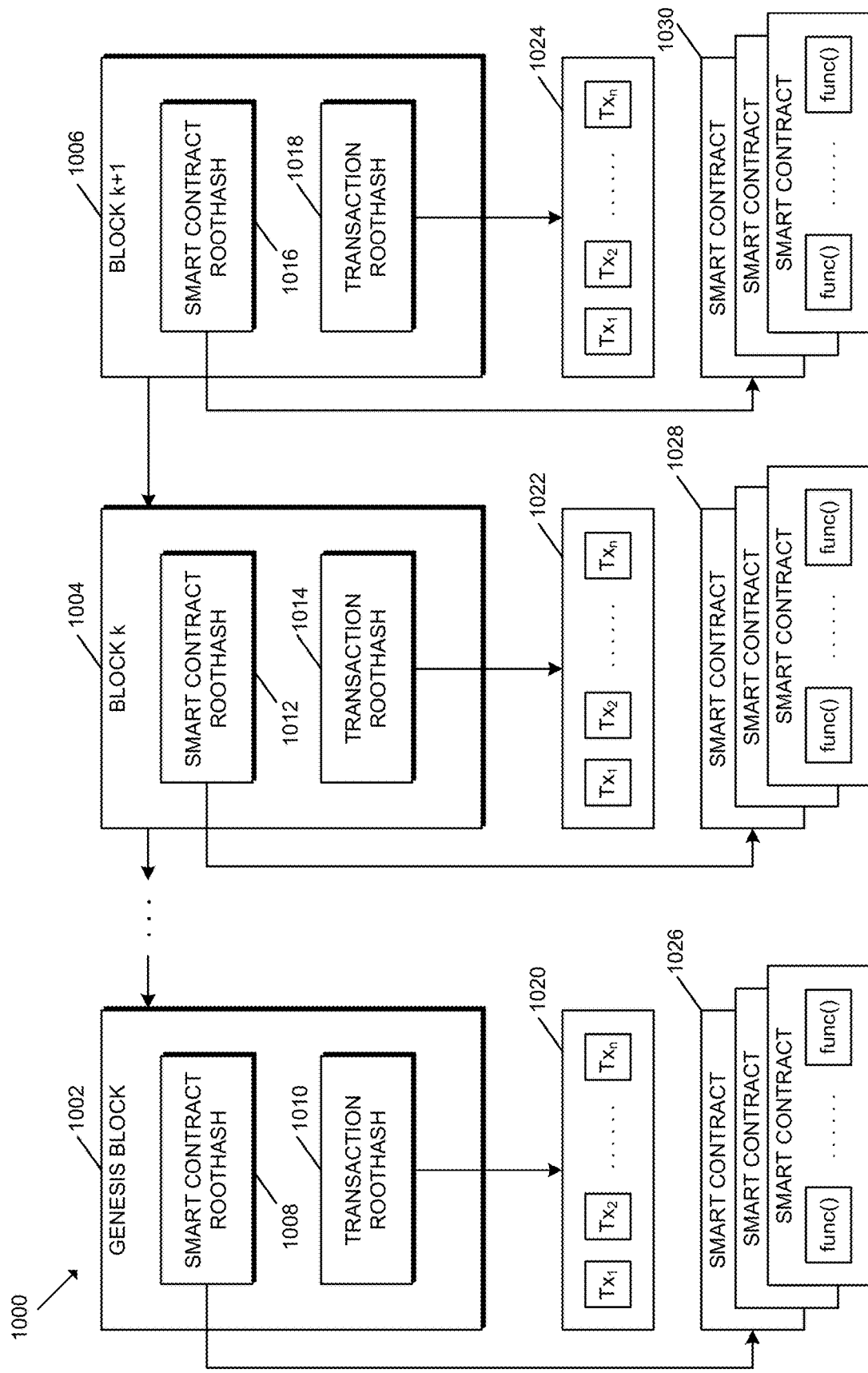
FIG. 10 is a simplified block diagram of at least one embodiment of a blockchain architecture that implements smart contracts.

Referring now to FIG. 10, a blockchain architecture includes a partial blockchain 1000 that implements one or more smart contracts includes a genesis block 1002, a block k 1004, and a block k+1 1004. It should be appreciated that the blocks 1002, 1004, 1006 illustrated in the blockchain 1000 may include only a portion of the full blockchain 1000, such that one or more additional blocks may be included between the genesis block 1002 and the block k 1004 (e.g., represented by the ellipsis). If the blockchain 1000 includes only the three blocks 1002, 1004, 1006, then the genesis block 1002 may also be described as the block k−1.

Each of the blocks in the illustrative blockchain 1000 includes a smart contract roothash and a transaction roothash. For example, the genesis block 1002 includes the smart contract roothash 1008 and the transaction roothash 1010, the block k 1004 includes the smart contract roothash 1012 and the transaction roothash 1014, and the block k+1 1006 includes the smart contract roothash 1016 and the transaction roothash 1018. As with the blockchain 700 of FIG. 7, it should be appreciated that multiple transactions may be stored to a particular block of the blockchain 1000 of FIG. 10. For example, as depicted in FIG. 10, the blockchain 1000 includes transactions 1020 ($T_{X_1}, T_{X_2}, \ldots, T_{X_n}$) included in or otherwise linked to the transaction root 1010 of the genesis block 1002, transactions 1022 ($T_{X_1}, T_{X_2}, \ldots, T_{X_n}$) included in or otherwise linked to the transaction root 1014 of the block 1004 (e.g., with timestamp k), and transactions 1024 ($T_{X_1}, T_{X_2}, \ldots, T_{X_n}$) included in or otherwise linked to the transaction root 1018 of block (e.g., with timestamp k+1). Further, in some embodiments, one or more smart contracts may be stored to the blocks of the blockchain 1000 and configured to automatically self-execute code and monitor for various conditions (e.g., with respect to interactions with the blockchain 1000) as described above. For example, as depicted in FIG. 10, the blockchain 1000 includes smart contracts 1026 included in or otherwise linked to the smart contract roothash 1008, smart contracts 1028 included in or otherwise linked to the smart contract roothash 1012, and smart contracts 1030 included in or otherwise linked to the smart contract roothash 1016. Although omitted for illustration of other properties of the blockchain 1000, it should be further appreciated that each of the blocks of the blockchain 1000 may also include a hash of the previous block's header (e.g., previous block to be added to the blockchain 1000 chronologically). It should be appreciated that the system 100 may the blockchain architecture of FIG. 10 may be used in conjunction with one or more of the techniques described herein.

Figure 11:
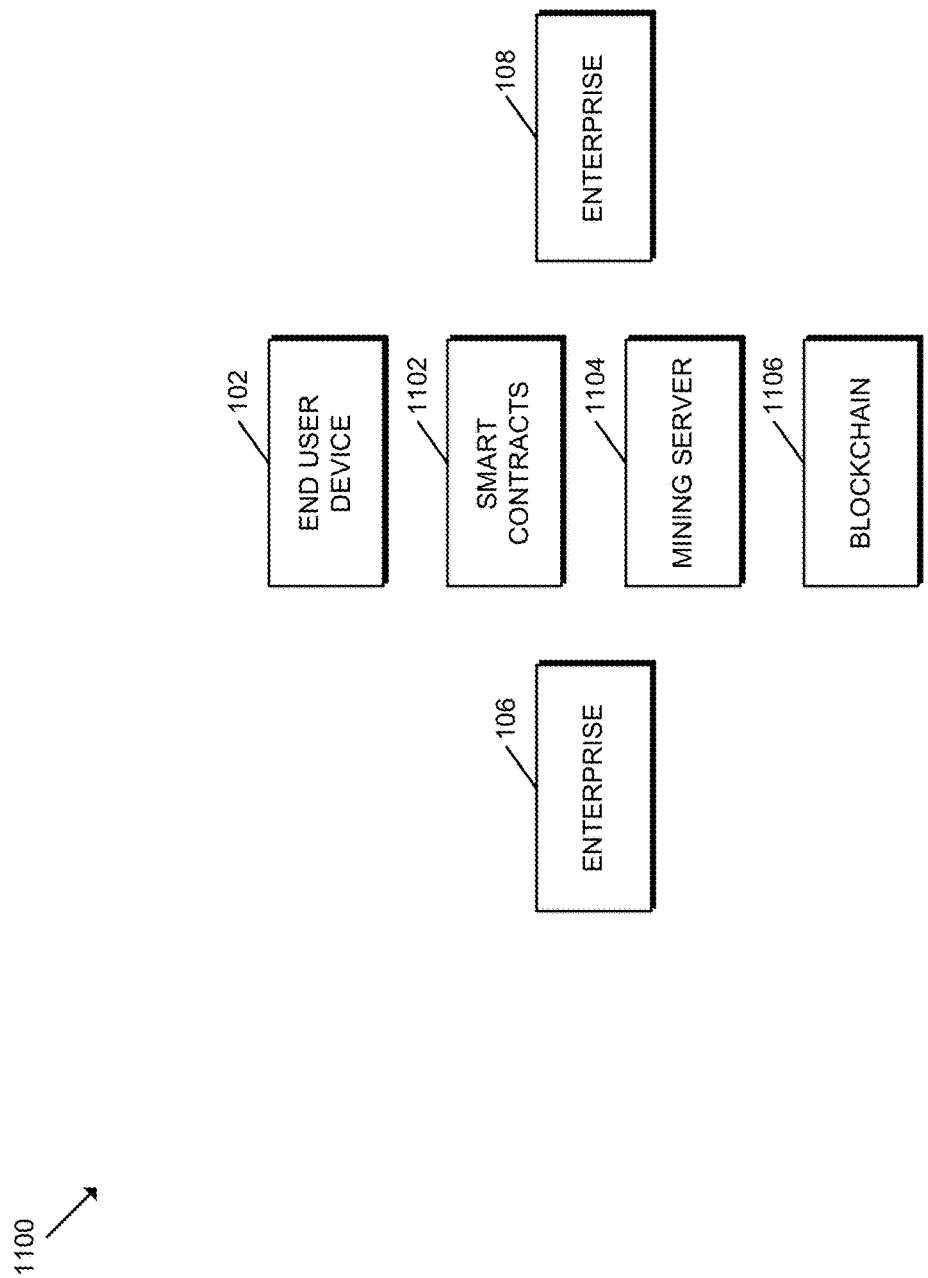
FIG. 11 is a simplified block diagram of at least one embodiment of an architecture for automatically completing data transactions using a permissioned blockchain infrastructure.

Referring now to FIG. 11, an architecture 1100 for automatically completing data transactions using a permissioned blockchain infrastructure includes an end user device 102, smart contracts 1102, a mining server 1104, a blockchain 1106, an enterprise 106, and an enterprise 108. The end user device 102, the enterprise 106, and the enterprise 108 of FIG. 11 are described above in reference to FIG. 1 and, therefore, the descriptions of those components are not repeated herein for brevity of the description. The smart contracts 1102 of FIG. 11 may be embodied as one of and/or otherwise consistent with the description of the smart contracts described in reference to FIGS. 8-10 or a portion thereof. The blockchain 1106 may be embodied as a blockchain having properties consistent with the description of the blockchain described in reference to FIGS. 4-7 and/or otherwise described herein. The mining server 1104 may be embodied as any one or more types of devices/systems capable of mining data and otherwise performing the functions described herein. In some embodiments, the mining server 1104 may be embodied as or include a server that leverages one or more machine learning algorithms to ascertain patterns and/or relevant information related to the underlying data, which may be used to facilitate prediction of events. The smart contracts 1102 may function based on an activity/trigger in the mining server 1104 that may run "on top of" the blockchain 1106. The smart contracts 1102 may execute an action associated with each such activity/trigger, thereby, storing the execution results in the blockchain 1106.

Figure 12:
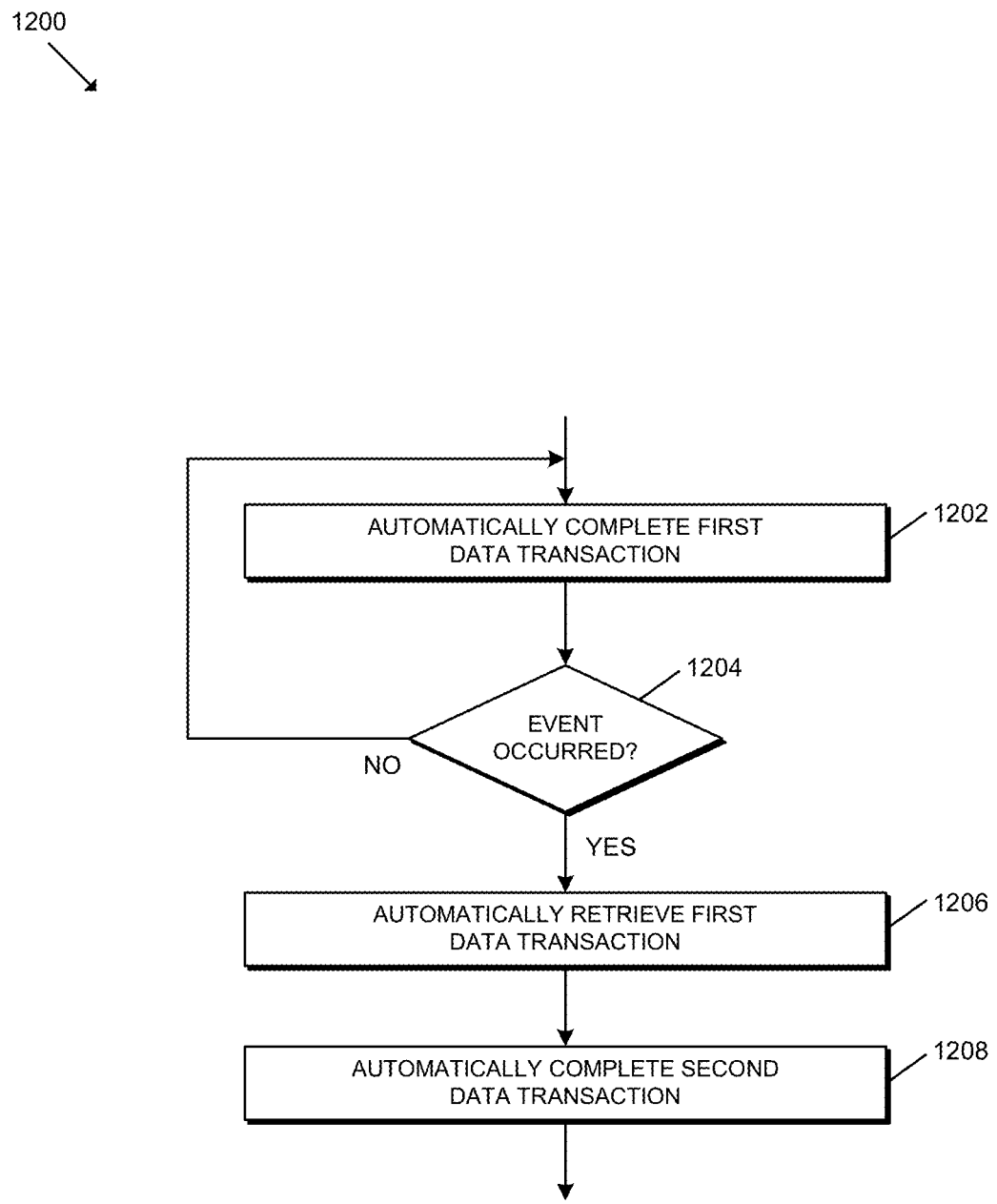
FIG. 12 is a simplified flow diagram of at least one embodiment of a method for automatically completing data transactions using a permissioned blockchain infrastructure.

Referring now to FIG. 12, in use, the system 100 may execute a method 1200 for automatically completing data transactions using a permissioned blockchain infrastructure. It should be appreciated that the particular blocks of the method 1200 are illustrated by way of example, and such blocks may be combined or divided, added or removed, and/or reordered in whole or in part depending on the particular embodiment, unless stated to the contrary. Prior to execution of the method 1200, it should be appreciated that an end user may interact with the end user device 102 via a user interface of the application 120 (e.g., the personal bot system and/or a graphical user interface) in order to communicate a request for data to an enterprise (e.g., the system 100, via the enterprise 106, may receive a request for data). For example, an end user may communicate an intent to book a flight to an airline enterprise (e.g., the enterprise 106) via the application 120 (e.g., the personal bot system).

The illustrative method 1200 may begin with block 1202 in which the system 100 (e.g., via the enterprise 106 or, more specifically, the contact center system 114 of the enterprise 106) may receive the request for data from the end user device 102 (e.g., via the application 120 or, more particularly, the personal bot system). In some embodiments, the request for data may be generated by the end user device 102 utilizing the application 120 (e.g., the personal bot system). In some embodiments, the request for data may be generated by the end user device 102 utilizing at least one of an email, a chat, a website search, a survey feedback, a voice, or a social media conversation. In some embodiments, the end user device 102 may be an IoT device. For example, the IoT readings of an end user's air conditioner may generate an interaction with an enterprise that the end user's air conditioner compressor may have problems and may need service. The system 100 (e.g., via the enterprise 106) may transmit the requested data to the end user device 102 (e.g., via the application 120 or, more particularly, the personal bot system), thereby, completing a first data transaction. For example, the enterprise 106 may complete the booking of a flight with the end user device 102. The system 100 may store the first data transaction on the blockchain of the present disclosure. In some embodiments, in doing so, the system 100 may execute the method 500 of FIG. 5 (or a portion thereof) as described in detail below in association with the method 1200 of FIG. 12.

In block 1204, they system 100 may determine whether an event associated with the first data transaction occurred at another enterprise (e.g., the enterprise 108) by using a mining server to automatically retrieve the first data transaction in response to identifying the event. If the system 100 determines that an event associated with the first data transaction occurred, the method 1200 may advance to block 1206 in which the system 100 may automatically retrieve the first data transaction. However, if the system 100 determines that an event associated with the first data transaction did not occur, the method 1200 may return to block 1202 (or wait until a relevant event has occurred). In block 1208, the system 100 (e.g., the enterprise 108) may automatically complete a second data transaction. For example, an internet commerce retail enterprise (e.g., the enterprise 108) may automatically notify a delivery service that the end user is not home based on the end user's flight booking as retrieved by the mining server in order to automatically reschedule delivery of a retail product). In some embodiments, the system 100 may communicate with the end user device 102 (e.g., via the application 120 or, more particularly, the personal bot system) to assist with completing the second data transaction. For example, the system 100 may determine the GPS location of the end user device 102 by accessing the application 120 (e.g., the personal bot system) of the end user device 102. In some embodiments, the system 100 (e.g., the enterprise 106) may communicate with the oracle system 134 to automatically request data from an off-chain enterprise (e.g., the enterprise 122) to complete the second data transaction. For example, the system 100 may locate a taxi cab's position by accessing the internal RFID tag of the taxi cab or the system 100 may review the weather in a particular location to determine the waiting time for an end user that booked a cab via a mobile application).

Although the blocks 1202-1208 are described in a relatively serial manner, it should be appreciated that various blocks of the method 1200 may be performed in parallel in some embodiments. After execution of the method 1200, it should be appreciated that the system 100 may store the second data transaction on the blockchain of the present disclosure. In some embodiments, in doing so, the system 100 may execute the method 500 of FIG. 5 (or a portion thereof) as described in detail below in association with the method 1200 of FIG. 12.

Figure 13:
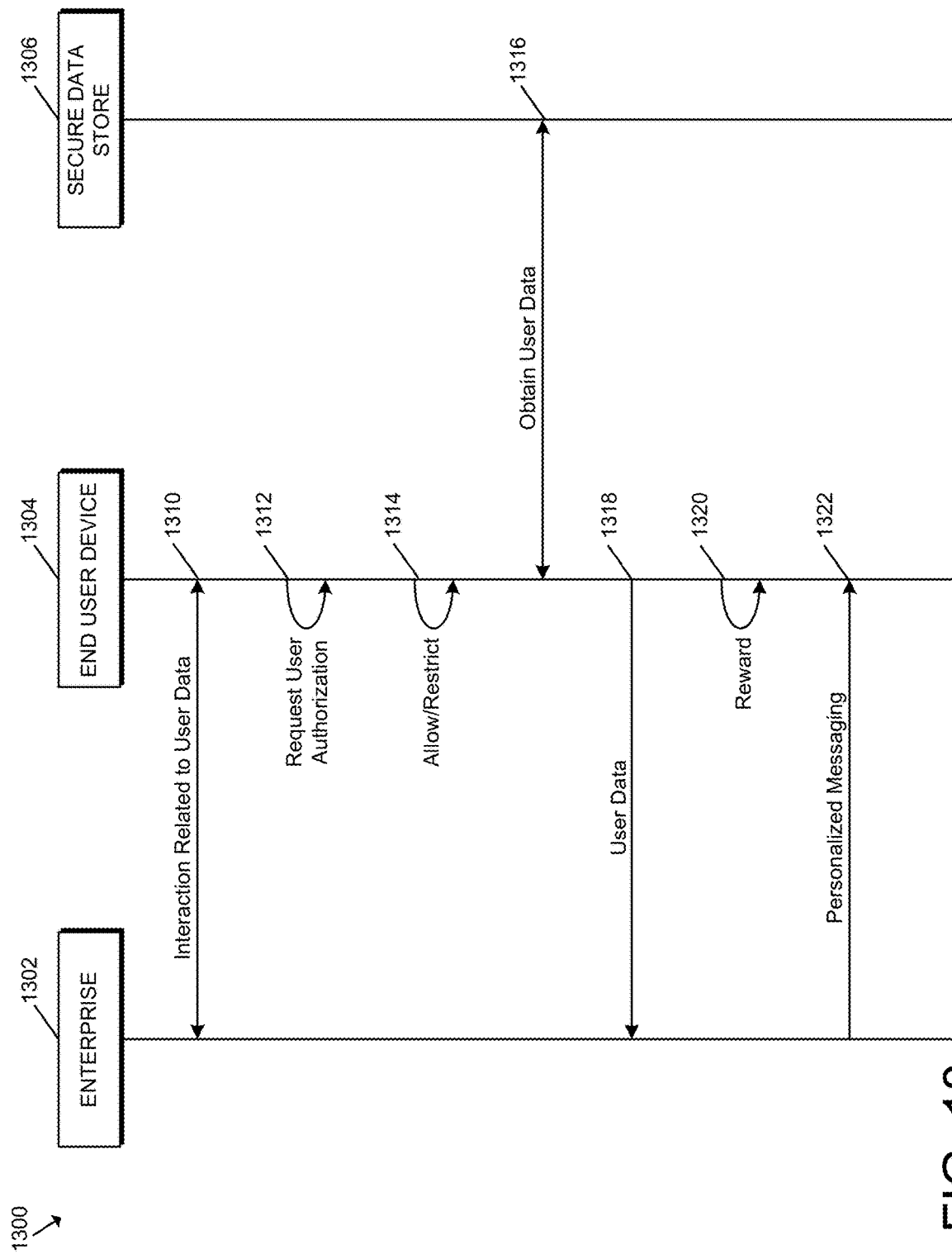
FIG. 13 is a simplified flow diagram of at least one embodiment of a method for personalizing a message based on secure user data.

Referring now to FIG. 13, in use, the system 100 may execute a method 1300 for personalizing a message based on secure user data. It should be appreciated that the particular flows of the method 1300 are illustrated by way of example, and such flows may be combined or divided, added or removed, and/or reordered in whole or in part depending on the particular embodiment, unless stated to the contrary.

The illustrative method 1300 of FIG. 13 depicts an enterprise 1302, an end user device 1304, and a secure data store 1306. It should be appreciated that, in some embodiments, the enterprise 1302 may be embodied as the enterprise 106 of FIG. 1 (or an enterprise similar to the enterprise 106), and therefore the details of the enterprise 1302 have not been repeated herein for brevity of the description. Similarly, the end user device 1304 may be embodied as the end user device 102 of FIG. 1 (or an end user device similar to the end user device 102), and the secure data store 1306 may be embodied as the secure data store 136 (or a secure data store similar to the secure data store 136). As such, the details of the end user device 1304 and the secure data store 1306 have likewise not been repeated herein for brevity of the description. It should be further appreciated that one or more of the transactions (e.g., every transaction) described in reference to the method 1300 of FIG. 13 may be stored to a blockchain associated with the blockchain network (e.g., of the enterprise system 112). Accordingly, every transaction may be logged in a tamper-proof distributed ledger in order to ensure the integrity of the data.

The method 1300 begins with flow 1310 in which the enterprise 1302 and the end user device 1304 have an interaction. For example, in some embodiments, the enterprise 1302 (e.g., an airline company) may request the user's preferences for suggesting personalized deals or other targeted information to the user. In another embodiment, the user may be searching for packages offered by the enterprise to book his next trip to Hawaii. As described above, it should be appreciated that the requested and/or relevant data may involve data stored in and/or otherwise associated with the software wallet 138 of the user.

In flow 1312, the user is notified of the request for the user data and prompts the user for authorization of the enterprise device 1302 to access/receive the user data. In some embodiments, it should be appreciated that one or more blocks stored on a blockchain network may result in self-execution of computer-executable code (e.g., a smart contract) that causes the user to be notified. The user may be notified of the request, for example, via a graphical user interface of the application 120 and/or the software wallet 138 of the end user device 1304. For example, the graphical user interface may notify the user of the access request and prompt the user to allow or restrict the request (e.g., via corresponding graphical elements). In some embodiments, it should be appreciated that the user may be prompted for authorization via the personal bot system of the end user device 1304.

In flow 1314, the user opts to allow or restrict the request (e.g., via user input), which the end user device 1304 receives and processes. If the user authorizes the access request, in flow 1316, the end user device 1304 obtains the requested user data (e.g., user preferences, identification information, etc.) from the secure data store 1306. For example, as described herein, the secure data store 1306 may be accessed via the software wallet 138 and/or the application 120 of the end user device 1304. If the access request is not authorized (i.e., restricted), the end user device 1304 may deny the request, transmit a denial/error message to the enterprise 1302, and/or perform one or more other error handling procedures. In flow 1318, the end user device 1304 transmits the retrieved user data to the requesting enterprise 1302. In some embodiments, in flow 1320, the end user device 1034 may earn a reward for participating in the sharing of the user data. In flow 1322, the enterprise 1302 transmits personalized messaging (e.g., one or more user-personalized messages) to the end user device 1304 based on the user data. For example, the personalized messaging could include personalized offers/deals based on the user preferences and/or other user-targeted information.

Although the flows 1302-1322 are described in a relatively serial manner, it should be appreciated that various flows of the method 1300 may be performed in parallel in some embodiments.

As described above, in some embodiments, the user may interact with one or more enterprises via a personal bot of the end user device 102. Additionally, in some embodiments, the personal bots may serve as endpoints for notifications intended for the end users. Further, the personal bots may predict and auto-trigger various authentication protocols (see, for example, the method 1400 of FIG. 14) and/or enable access to multi-signature software wallets (see, for example, the method 1500 of FIG. 15).

Figure 14:
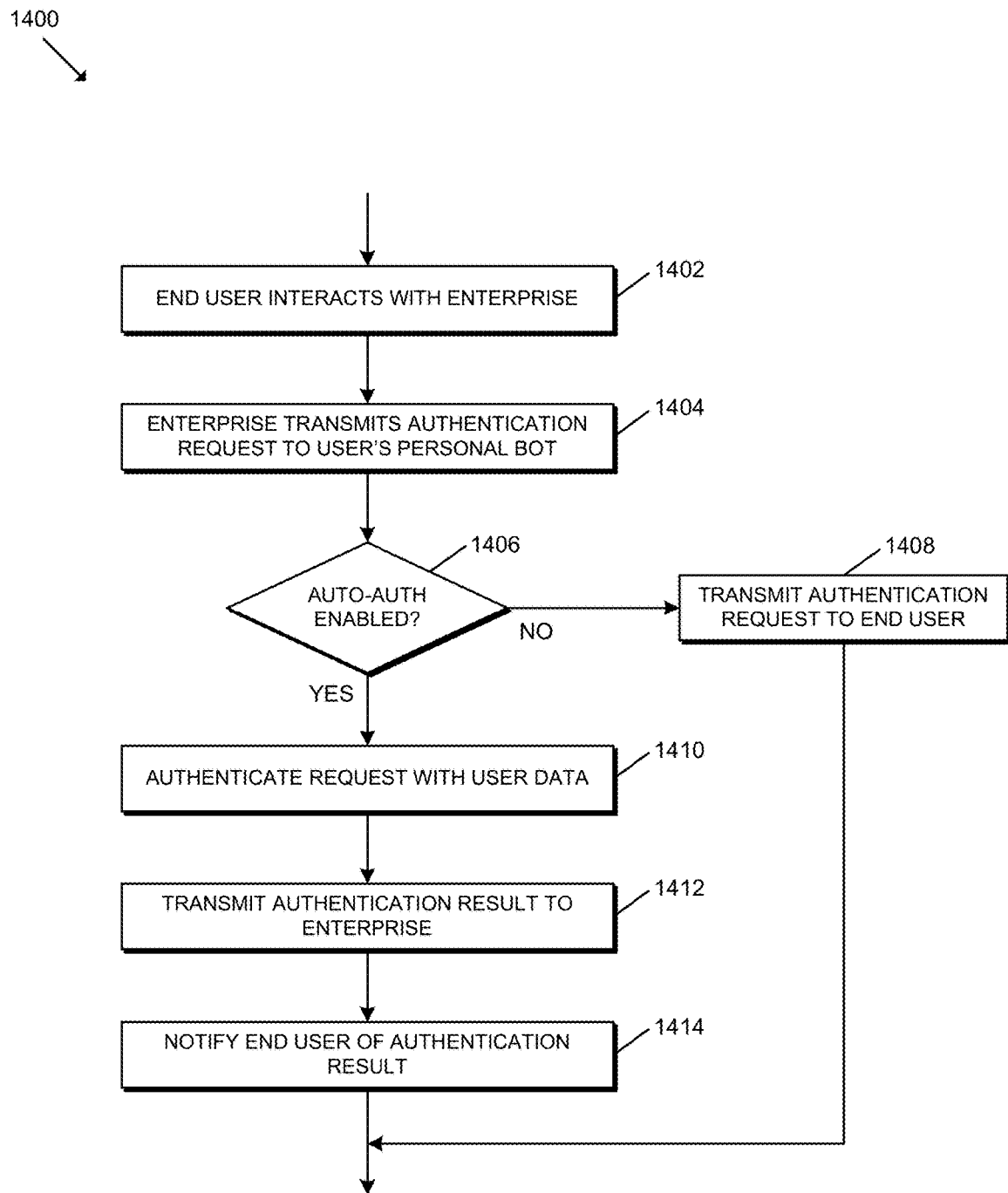
FIG. 14 is a simplified flow diagram of at least one embodiment of a method for facilitating interactions between enterprises and software wallets of users.

Referring now to FIG. 14, in use, the system 100 may execute a method 1400 for facilitating interactions between enterprises and software wallets of a user. It should be appreciated that the particular blocks of the method 1400 are illustrated by way of example, and such blocks may be combined or divided, added or removed, and/or reordered in whole or in part depending on the particular embodiment, unless stated to the contrary.

The method 1400 begins with block 1402 in which the end user interacts with an enterprise (e.g., the enterprise 106). In block 1404, the enterprise with which the user has interacted (e.g., the enterprise 106) transmits an authentication request to the user's personal bot (e.g., at the end user device 102). In block 1406, the user's personal bot determines whether the user has enabled automated authentication by the bot on the user's behalf (e.g., via settings in the software wallet 138). If the user has not authorized automated authentication, the method 1400 advances to block 1408 in which the personal bot (e.g., the end user device 102) transmits an authentication request to the end user. For example, in some embodiments, the end user device 102 may prompted to allow/restrict the request via a graphical user interface in a manner similar to that described above (see, for example, flow 1312 of FIG. 13).

Returning to block 1406, if the user has authorized automated authentication, the method 1400 advances to block 1410 in which the user's personal bot authenticates the authentication request with user data. For example, in some embodiments, the user's personal bot may authenticate the request based on user data and/or settings stored in or defined by the user's software wallet 138. In block 1412, the personal bot (e.g., the end user device 102) transmits the authentication result to the requesting enterprise (e.g., the enterprise 106) and, in block 1414, the enterprise and/or the end user device 102 notifies the end user of the authentication result (e.g., authenticated or denied).

Although the blocks 1402-1414 are described in a relatively serial manner, it should be appreciated that various blocks of the method 1400 may be performed in parallel in some embodiments.

It should be appreciated that a user's personal bot and/or the software wallet 138 may be used for other circumstances in a manner similar to the various techniques described herein. For example, the user's personal bot and/or software wallet 138 may be used to have the personal bot automatically reuse data collected from one enterprise for interactions with another (i.e., if authorized to do so). Further, in some embodiments, the user's personal bot and/or software wallet 138 may be used for automated completion of forms, documents, and/or webpages using details from the user's software wallet 138.

Figure 15:
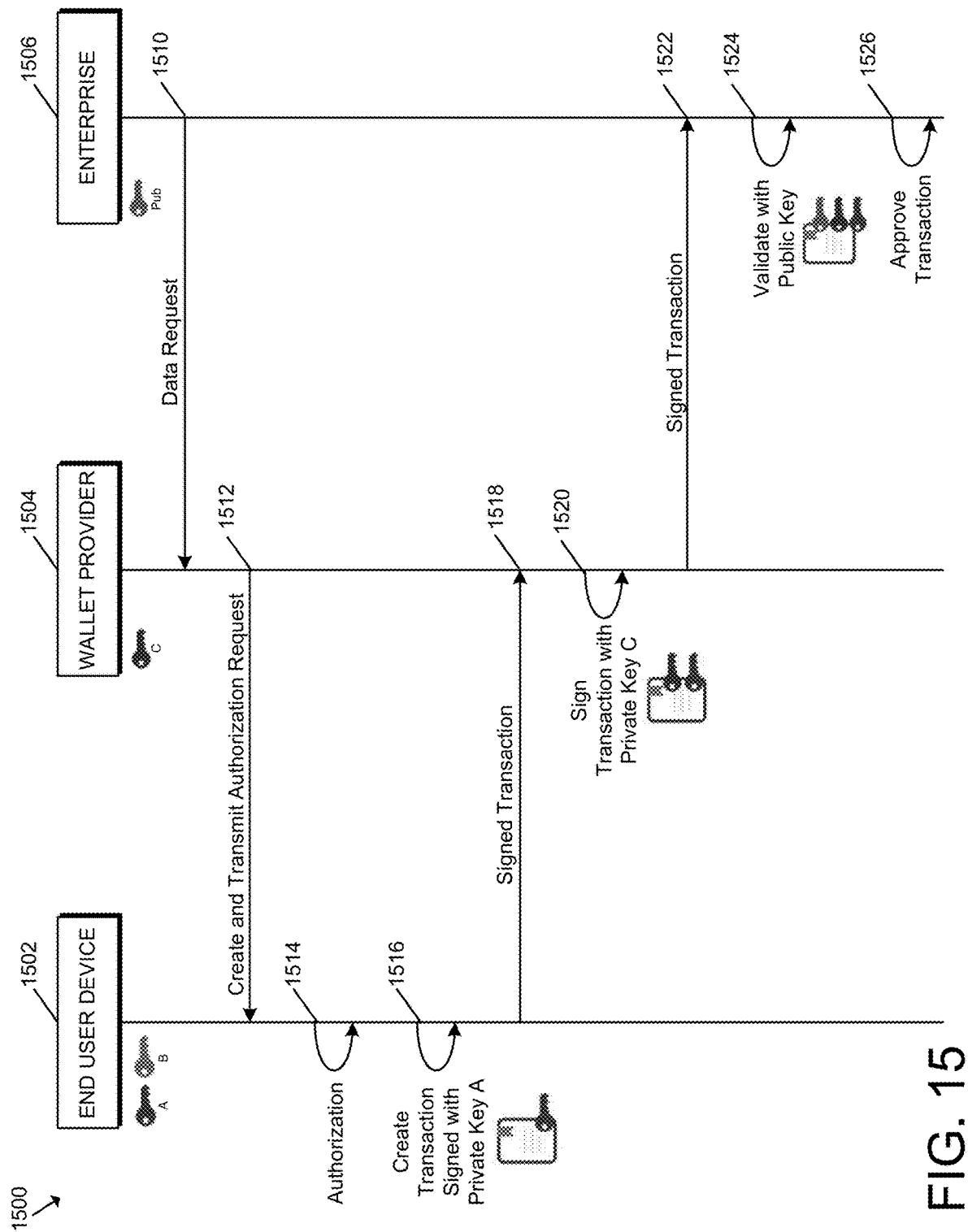
FIG. 15 is a simplified flow diagram of at least one embodiment of a method for blockchain-based multi-signature authentication.

Referring now to FIG. 15, in use, the system 100 may execute a method 1500 for blockchain-based multi-signature authentication. It should be appreciated that the particular flows of the method 1500 are illustrated by way of example, and such flows may be combined or divided, added or removed, and/or reordered in whole or in part depending on the particular embodiment, unless stated to the contrary.

The illustrative method 1500 of FIG. 15 depicts an end user device 1502, a software wallet provider 1504, and an enterprise 1506. It should be appreciated that, in some embodiments, the end user device 1502 may be embodied as the end user device 102 of FIG. 1 (or an end user device similar to the end user device 102), and therefore the details of the end user device 1502 have not been repeated herein for brevity of the description. Similarly, the enterprise 1506 may be embodied as the enterprise 106 of FIG. 1 (or an enterprise similar to the enterprise 106), and therefore the details of the enterprise 106 have likewise not been repeated herein for brevity of the description. The software wallet provider 1504 may be embodied as any type of system or device capable of performing the functions described herein. In some embodiments, the software wallet provider 1504 may be embodied as one or more of the devices described in reference to the system 100 of FIG. 1.

It should be appreciated that the techniques described herein utilize multi-signature wallets that can securely and safely authenticate a user's identity with any number of enterprises 106, 108, 110 in the blockchain network. The multi-signature wallet described herein adds another layer of security to the process of authentication. In the illustrative embodiment of FIG. 15, the multi-signature authentication involves the use of two private cryptographic keys (selected from three private cryptographic keys) and one public cryptographic key for the authentication algorithm. Further, the method 1500 of FIG. 15 assumes that a key exchange has occurred to ensure that the relevant cryptographic keys are already stored on the appropriate devices/components. In particular, as shown, the illustrative end user device 1502 has stored thereon two private cryptographic keys (Private Key A and Private Key B), the software wallet provider 1504 has stored thereon one private cryptographic key (Private Key C), and the enterprise 1506 has stored thereon the corresponding public cryptographic key (Public Key). In some embodiments, one of the private cryptographic keys stored to the end user device 1502 (e.g., the Private Key B) may serve as a backup key for the user in the event that the other key (e.g., the Private Key A) is lost or becomes inoperable (e.g., due to data corruption or deletion).

The method 1500 begins with flow 1510 in which the enterprise 1506 transmits a data request for user data stored in a software wallet 138 to the software wallet provider 1504. In flow 1512, the software wallet provider 1504 creates a corresponding authorization request and transmits the authorization request to the end user device 1502 (e.g., the application 120, personal bot, and/or other application) associated with the request. In flow 1514, the end user device 1502 prompts the user to authorize the request. For example, in some embodiments, the end user device 1502 may prompt the user to allow/restrict the request via a graphical user interface in a manner similar to that described above (see, for example, flow 1312 of FIG. 13 and/or block 1408 of FIG. 14).

In flow 1516, the end user device 1502 creates a transaction signed with one of the private cryptographic keys stored thereon (e.g., Private Key A) to generate a signed (or partially signed) transaction and, in flow 1518, the end user device 1502 transmits the signed transaction to the software wallet provider 1504. In flow 1520, the software wallet provider 1504 signs the signed (or partially signed) transaction with the private cryptographic key stored thereon (e.g., Private Key C) to generate a multi-signed transaction and, in flow 1522, the multi-signed transaction is transmitted to the enterprise 1506.

In flow 1524, the enterprise 1506 validates the multi-signed transaction using the public cryptographic key stored thereon (e.g., the Public Key) associated with the private cryptographic keys used to generate the multi-signed transaction (e.g., Private Key A and Private Key C). It should be appreciated that the particular cryptographic algorithm(s) used to generate the cryptographic keys and perform the multi-signature authentication may vary depending on the particular embodiment. For example, in some embodiments, the multi-signed transaction is validated using a 2-of-3 multi-signature blockchain algorithm, which requires two of three valid private cryptographic keys to be used to sign the transaction in order for it to be successfully authenticated by the corresponding public cryptographic key. In other words, in the illustrative embodiment, the Public Key stored on the enterprise 1506 would be able to successfully authenticate both (i) a transaction signed by the Private Key A and the Private Key C and (ii) a transaction signed by the Private Key B and the Private Key C.

In flow 1526, the enterprise 1506 approves the multi-signed transaction if the public key of the enterprise is able to successfully authenticate the signatures. Accordingly, the requested data may be transmitted to the enterprise 1506, and the transaction may be added to the relevant blockchain.

Although the flows 1502-1526 are described in a relatively serial manner, it should be appreciated that various flows of the method 1500 may be performed in parallel in some embodiments. It should be further appreciated that one or more of the transactions described in reference to the method 1500 of FIG. 15 may be embodied as a blockchain transactions and, therefore, the transactions may be stored to one or more blocks on a blockchain in the system 100 in a manner similar to that described herein at one or more points during the execution of the method 1500 of FIG. 15.

Although the authentication of FIG. 15 is described in reference to authorizing access to data, it should be appreciated that the user may also be able to revoke permissions given to a particular enterprise (e.g., automatically via an interaction and/or manually via settings in the software wallet 138). Further, in some embodiments, the techniques described herein may be used for personalized customer service, personalized marketing, synchronous authentication, asynchronous authentication, and/or other use cases.

Figure 16:
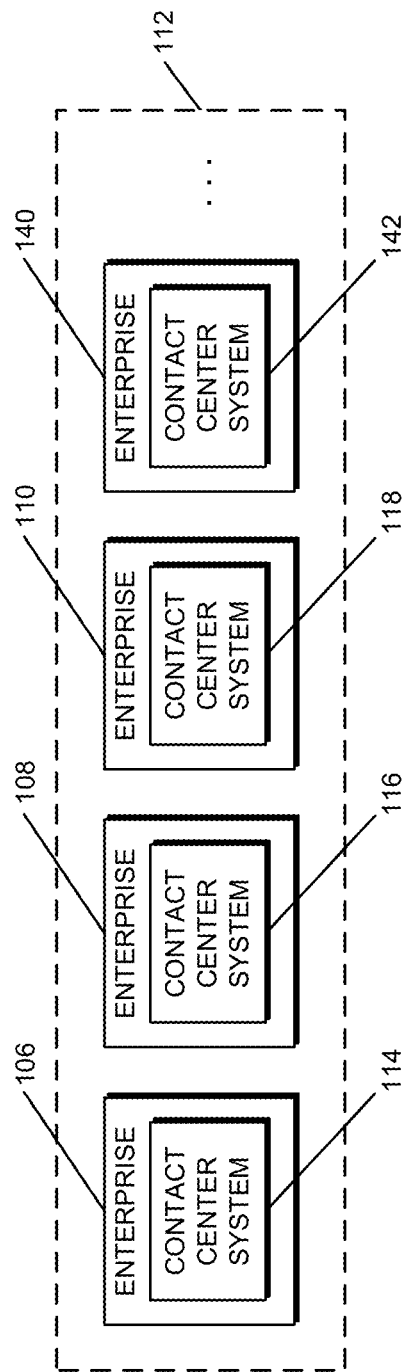
FIG. 16 is a simplified block diagram of at least one embodiment of an enterprise system.

Referring now to FIG. 16, an embodiment of an enterprise system 112 includes an enterprise 106, an enterprise 108, an enterprise 110, an enterprise 140, a contact center system 114, a contact center system 116, a contact center system 118, and a contact center system 142. The enterprise 106, the enterprise 108, the enterprise 110, the contact center system 114, the contact center system 116, and the contact center system 118 of FIG. 16 may be embodied as the corresponding enterprises/systems of FIG. 1 and, therefore, the descriptions of those components are not repeated herein for brevity of the description. The description above concerning the enterprises 106, 108, 110 and the contact center systems 114, 116, 118 may apply similarly to the enterprise 140 and the contact center system 142, respectively. As described above regarding FIG. 1, it should again be appreciated that the enterprise system 112 may include other enterprises that are not shown in FIG. 16 such that one or more additional enterprises may be included in the enterprise system 112 (e.g., represented by the ellipsis).

In some embodiments, each of the enterprises 106, 108, 110, 140 may be embodied as any type of device capable of executing an application (e.g., an enterprise application) and otherwise performing the functions described herein. It should be appreciated that the enterprise application may be embodied as any type of application suitable for performing the functions described herein. In particular, in some embodiments, the enterprise application may be embodied as a mobile application (e.g., a smartphone application), a cloud-based application, a web application, a thin-client application, and/or another type of application. For example, in some embodiments, the enterprise application may serve as a client-side interface (e.g., via a web browser) for a web-based application or service.

In some embodiments, the enterprise application may be an automated agent (i.e., an enterprise agent) configured to automate interactions with end users (e.g., via the end user device 102 or, more specifically, the personal bot agent) and/or other devices/services to conduct enterprise specific functions. For example, the enterprise agent may function as a seller agent, a marketing agent, a navigation agent, etc. The enterprise agent may be personalized for each enterprise. For example, the enterprise agent may learn an enterprise's details such as, for example, end user satisfaction, end user retention, end user feedback, scoring, price, revenue, and/or other enterprise details. By learning the enterprise's details, the enterprise agent may be able to best serve the enterprise when interacting with end users.

The enterprise agent may be physically located in, and performed by, an enterprise (e.g., the enterprises 106, 108, 110, 140) whereas other aspects of the enterprise-side system may be physically located in, and executed by, a cloud computing service (e.g., the cloud computing service 230 of FIG. 2). The enterprise agent may interact with end users (e.g., the end user device 102 or, more specifically, the personal bot agent) on behalf of the enterprise to provide data to the end users (e.g., data regarding products and/or services). During the interaction, the enterprise agent may prompt the enterprise (e.g., the enterprises 106, 108, 110, 140) for additional information requested by the personal bot agent if the enterprise agent does not have access to the information, or the enterprise agent may automatically respond to a question from a personal bot agent based on access to an enterprise's details.

It should also be appreciated that the contact center systems 114, 116, 118, 142 may also be embodied as any type of device capable of executing an application (e.g., an enterprise application or, more specifically, an enterprise agent) and otherwise performing the functions described herein. In other words, the contact center systems 114, 116, 118, 142 may include an enterprise agent as described above regarding the enterprises 106, 108, 110, 140. Additionally, although only the enterprises 106, 108, 110, 140 are described as being capable of executing an application (e.g., an enterprise application or enterprise agent), the enterprises 122, 124, 126 may also be capable of executing an application (e.g., an enterprise application or, more specifically, an enterprise agent) in other embodiments. Similarly, the contact center systems 128, 130, 132 may also be capable of executing an application (e.g., an enterprise application or, more specifically, an enterprise agent) in other embodiments.

Figure 17:
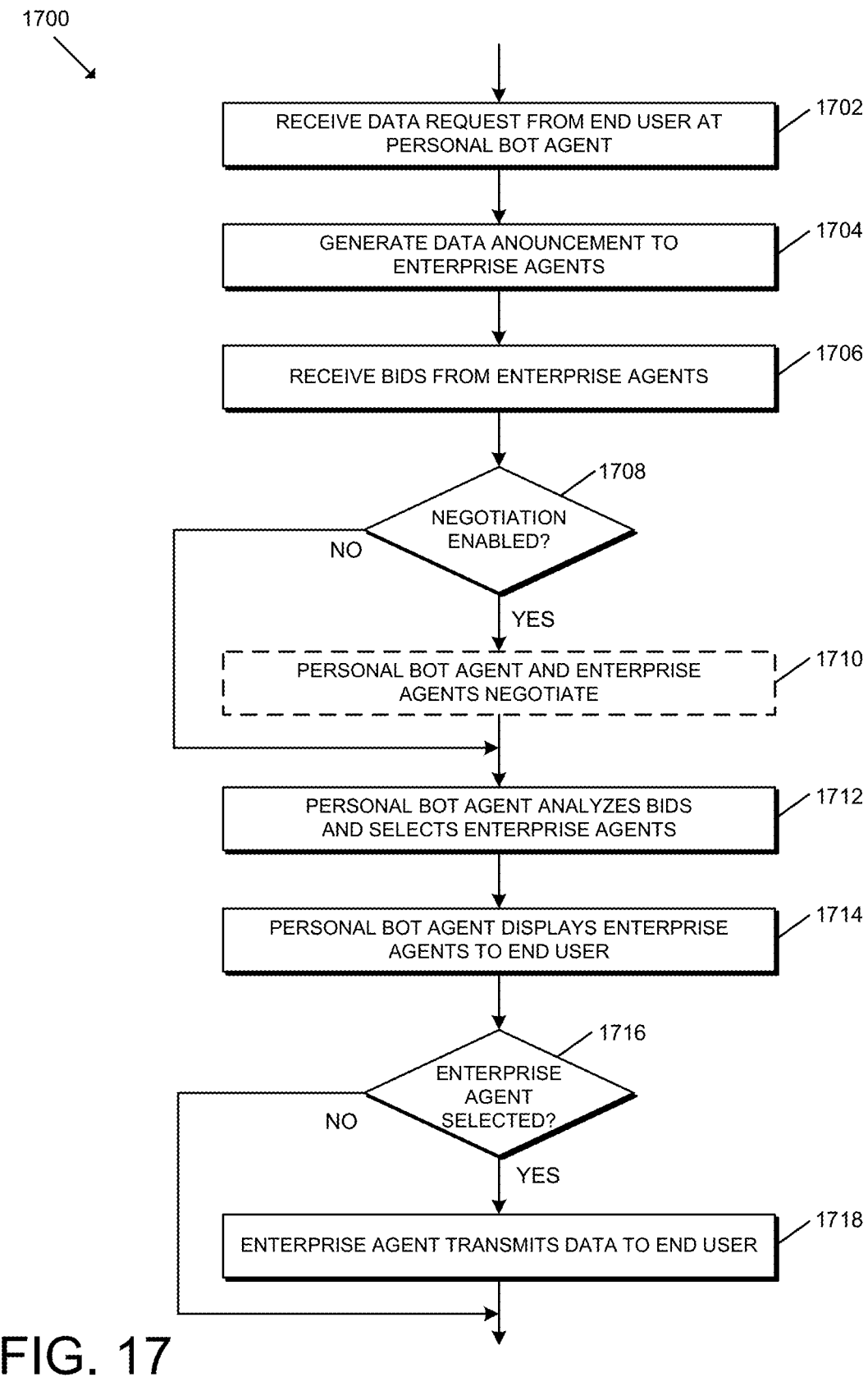
FIG. 17 is a simplified flow diagram of at least one embodiment of a method for data bidding and negotiating in an enterprise system using a permissioned blockchain infrastructure.

Referring now to FIG. 17, in use, the system 100 may execute a method 1700 for data bidding and negotiating in an enterprise system using a permissioned blockchain infrastructure. It should be appreciated that the particular blocks of the method 1700 are illustrated by way of example, and such blocks may be combined or divided, added or removed, and/or reordered in whole or in part depending on the particular embodiment, unless stated to the contrary. In some embodiments, the method 1700 may use a multi-agent system and a permissioned blockchain infrastructure to exchange (e.g., sell, connect, trade, transfer, etc.) data and end user service across enterprises (e.g., the enterprises 106, 108, 110, 140) using a personal bot agent as a connection medium between an end user and enterprises.

With the expansion of the Internet, end user service has also grown. To keep up with the growth of end user service, it may be necessary to use a multi-agent system in some embodiments to make automated end user centric decisions and ease the process of end users interacting with enterprises. A multi-agent system may generally be composed of loosely coupled agents interconnected and organized in a network. An agent may be an autonomous entity having an expandable knowledgebase and being incentivized by self-developed or induced objectives. Moreover, an agent may observe the surrounding environment through a perception layer and possibly interact with the perception layer as well as with other agents. In some embodiments, the agent may be a personal bot agent. In some embodiments, the agent may be an enterprise agent. The personal bot agent and the enterprise agent may each have individual use case specific capabilities allowing each agent to autonomously execute its operations with artificial intelligence supporting the backend. The degrees of cooperation among the agents, the type of application, and the agent interaction model may generate a broad range of behaviors and applications, including, for example, knowledge/data sharing among agents, message passing strategies, agreement and consensus, reputation and trust among agents, voting systems, agent identity management, etc. A multi-agent system may provide a promising application of agent and artificial intelligence technology and may be used to manage sensitive data. A multi-agent system may emulate human social systems behavior. Therefore, when a multi-agent system is enabled to manage sensitive data, the accountability and trust of the agents and the interactions between the agents and the end users must be maintained. To solve the many issues of security and trustworthiness in a multi-agent system, it may be desirable to combine a multi-agent system with blockchain technology. Blockchain technology may overcome the security limitations in a multi-agent system. Further, blockchain technology based data marketplaces may create a way to reduce the risk of data tampering through the use of smart contracts and may not require data providers and data consumers to trust each other in the marketplace. Trust is a critical factor when dealing with authentication of marketplace participants, data, and payments.

The illustrative method 1700 may begin with block 1702 in which the end user device 102 (e.g., via the application 120 or, more particularly, the personal bot agent) may receive a request for data from an end user. For example, in a retail purchasing scenario involving an end user shopping for jeans, the personal bot agent may ask the end user via a graphical user interface of the personal bot system questions regarding the jeans to be purchased, including the price, quantity, color, brand, size, regular/skinny/slim fit, low/high waist, delivery city, delivery date, delivery charges, quality, reviews, etc. The personal bot agent may conduct the process of product brokering (i.e., the process of selecting a product, such as jeans) that matches the end user preferences and such process may be automated by using a multi-agent system.

Figure 18:
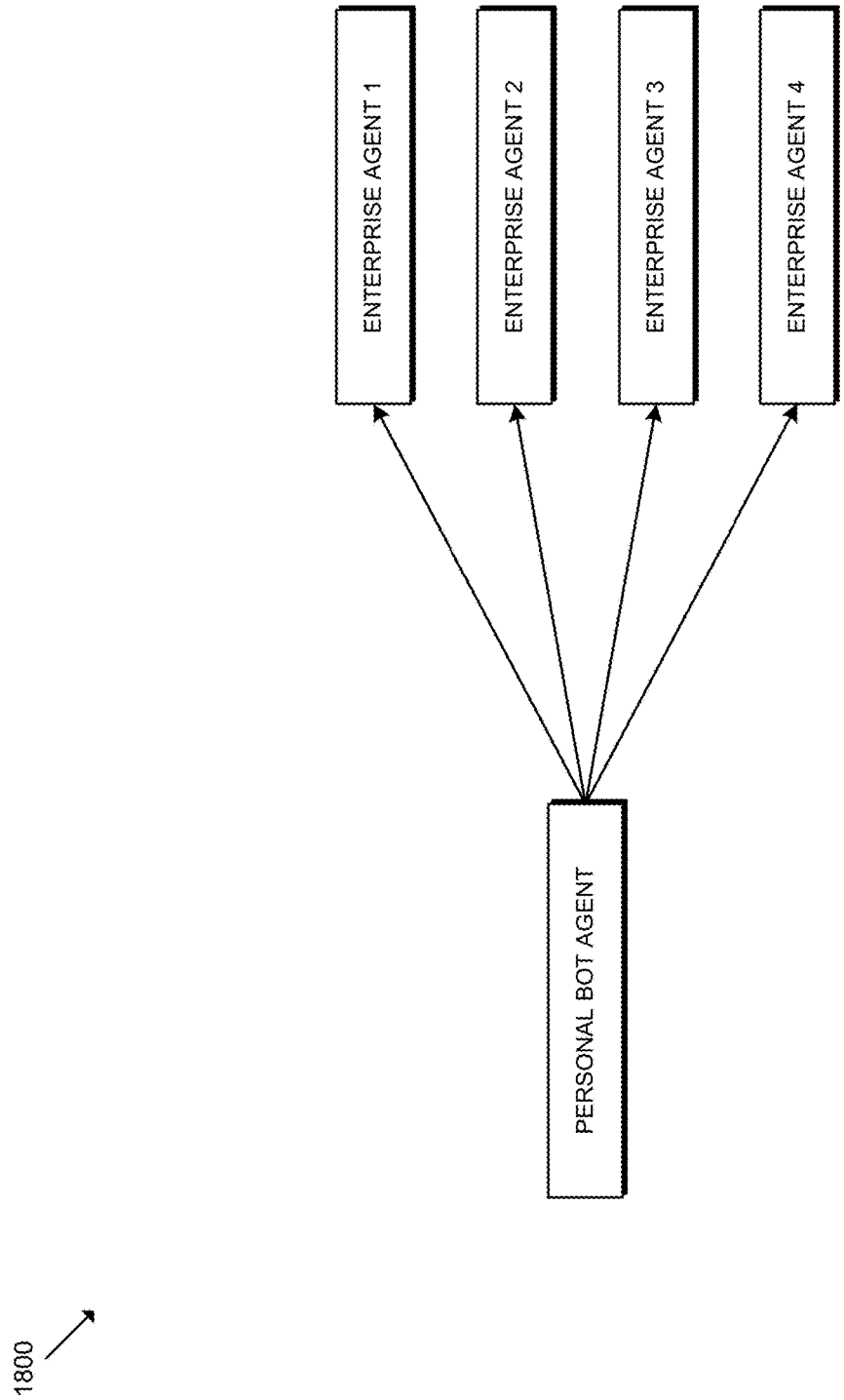
FIG. 18 is a simplified block diagram of at least one embodiment of a data announcement scheme for data bidding and negotiating in an enterprise system using a permissioned blockchain infrastructure.
Figure 19:
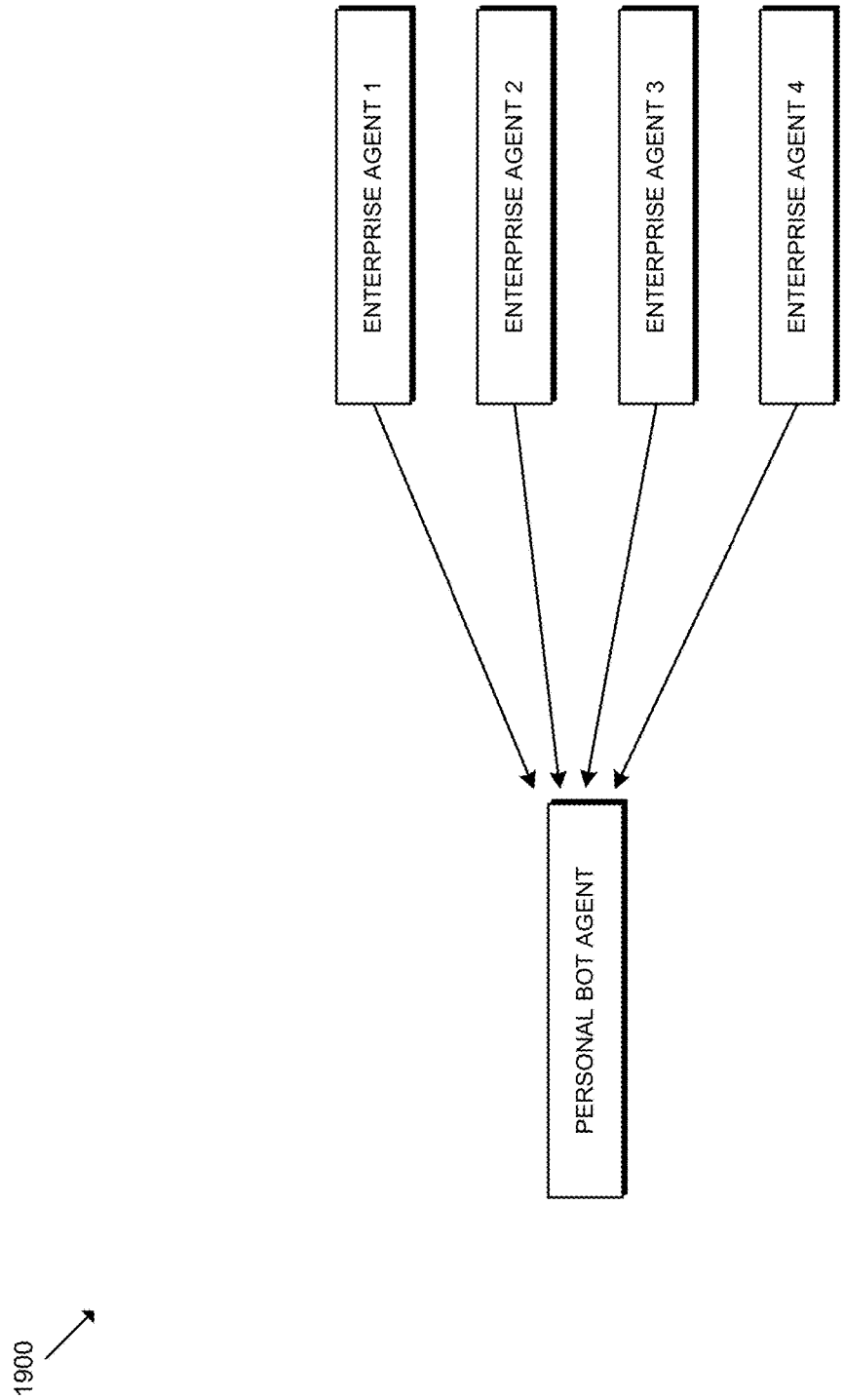
FIG. 19 is a simplified block diagram of at least one embodiment of a data bidding scheme for data bidding and negotiating in an enterprise system using a permissioned blockchain infrastructure.
Figure 20:
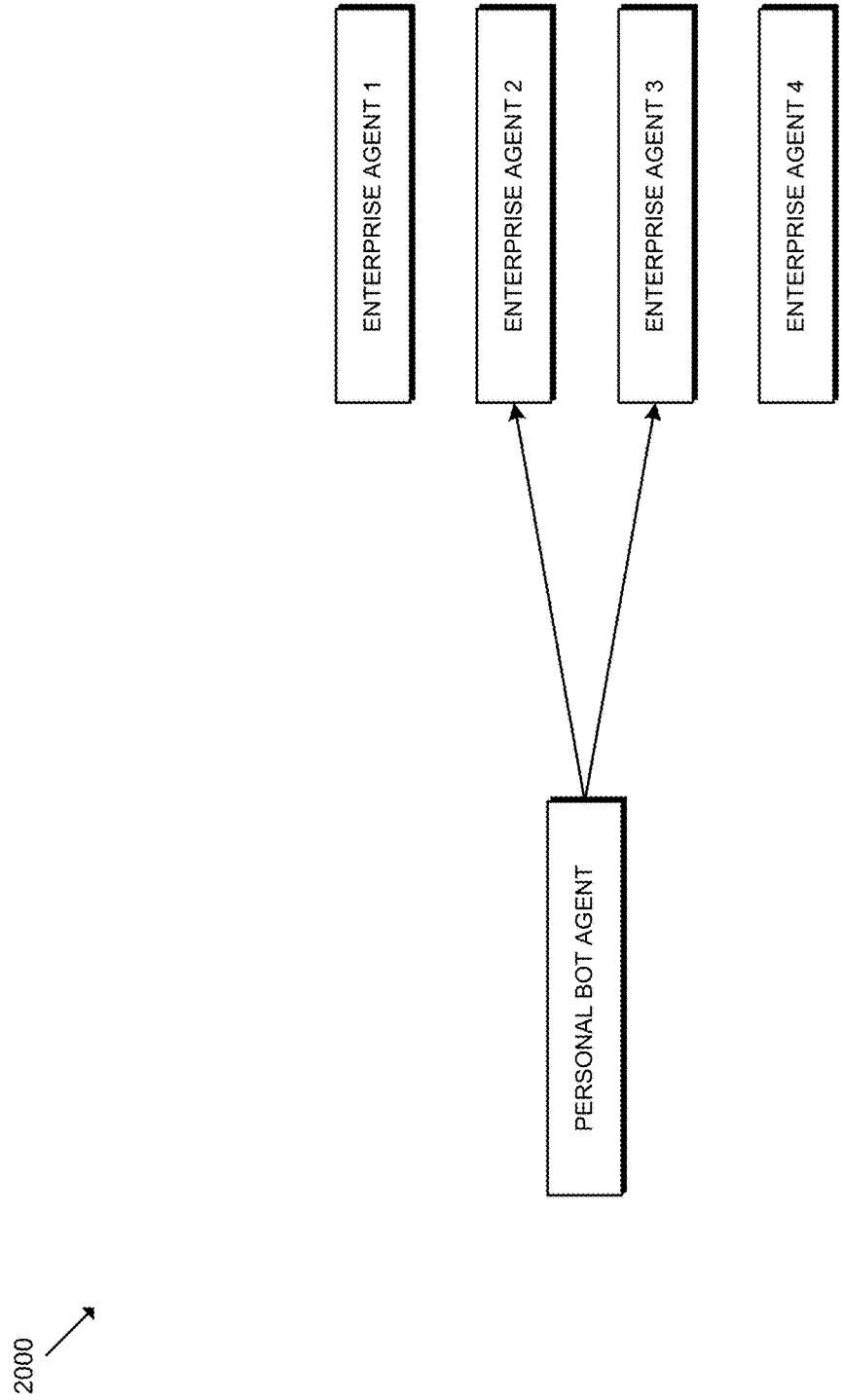
FIG. 20 is a simplified block diagram of at least one embodiment of a bid selection scheme for data bidding and negotiating in an enterprise system using a permissioned blockchain infrastructure.

In block 1704, the end user device 102 (e.g., via the application 120 or, more particularly, the personal bot agent) may generate an announcement (e.g., a product query) including the requested data to the enterprise agents in an enterprise system (e.g., the enterprise system 112 illustrated in FIG. 16). For example, FIG. 18 illustrates at least one embodiment of the data announcement described in reference to block 1704 of FIG. 17. Referring to FIG. 18, the personal bot agent may generate an announcement to Enterprise Agent 1, Enterprise Agent 2, Enterprise Agent 3, and Enterprise Agent 4. In some embodiments, the enterprise system 112 may include the enterprises 106, 108, 110, 140. The enterprises 106, 108, 110, 140 may each include an enterprise agent. In some embodiments, the enterprise agents may be Enterprise Agent 1, Enterprise Agent 2, Enterprise Agent 3, and Enterprise Agent 4 as illustrated in FIGS. 18-20. In some embodiments, the announcement may initiate data bidding by the enterprise system (e.g., the enterprise system 112 illustrated in FIG. 16). Returning to the retail purchasing scenario, the personal bot agent may decide on behalf of the end user which retail enterprise system and/or retail enterprises from which to buy the jeans. Each retail enterprise (e.g., the enterprises 106, 108, 110, 140) may include a retail enterprise agent (e.g. a seller agent) that holds all of the data/information regarding the jeans (indexed and referenced appropriately) that the retail enterprise desires to sell. The personal bot agent may make a product query (e.g., data announcement) for jeans to the retail enterprise agents of the retail enterprises (e.g., the enterprises 106, 108, 110, 140).

In some embodiments, the personal bot agent and/or the enterprise agent includes and/or leverages artificial intelligence, adaptive learning, bots, cognitive computing, and/or other automation technologies. In some embodiments, the personal bot agent and/or the enterprise agent may leverage one or more machine learning and/or artificial intelligence techniques to make decisions and/or perform actions. For example, in some embodiments, the personal bot agent and/or the enterprise agent may utilize one or more neural network algorithms, regression algorithms, instance-based algorithms, regularization algorithms, case-based reasoning algorithms, reinforcement learning algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms. In some embodiments, the personal bot agent and/or the enterprise agent may utilize at least one of a case-based reasoning algorithm and a reinforcement learning algorithm. In an embodiment, a case-based reasoning algorithm may be utilized to solve a new problem by recalling a previous experience suitable for solving the new problem. It should be appreciated that any device/system described herein may utilize one or more of these machine learning and/or artificial intelligence algorithms, techniques, and/or mechanisms.

In block 1706, each enterprise agent of each enterprise (e.g., the enterprises 106, 108, 110, 140) may evaluate the announcement including the request for data. In some embodiments, each enterprise agent evaluates the requested data stored by each enterprise to determine whether a match exists between the request for data from the end user and the data stored by the enterprise. If a match exists between the request for data from the end user and the data stored by an enterprise (i.e., the data is the requested data), the personal bot agent may receive one or more bids including the requested data in response to each enterprise having a match submitting a bid to the personal bot agent. For example, FIG. 19 illustrates at least one embodiment of the data bidding described in reference to block 1706 of FIG. 17. Referring to FIG. 19, Enterprise Agent 1, Enterprise Agent 2, Enterprise Agent 3, and Enterprise Agent 4 may submit bids to the personal bot agent. A bid may indicate the capabilities of the bidding enterprise (e.g., the enterprises 106, 108, 110, 140) that may be relevant to the data announcement (e.g. including the requested data). If a match does not exist between the request for data from the end user and the data stored by an enterprise (i.e., the data is not the requested data), the personal bot agent may still receive one or more bids including data that is similar to the requested data in response to each enterprise not having a match submitting a bid to the personal bot agent. Referring back to the retail purchase example, a retail enterprise agent may compare the jeans product query (e.g., data announcement) received from the personal bot agent with the product specifications for jeans that may be stored in a data storage device/system by the retail enterprise. When a retail enterprise agent finds a match between the jeans product query and the retail enterprise's product specifications for jeans, the retail enterprise agent may submit a bid. The bid may include data/information such as price, brand, delivery date, delivery area, etc. When a retail enterprise agent does not find an exact match between the jeans product query and the retail enterprise's product specifications for jeans (e.g., the end user desires blue jeans but the enterprise has only black jeans), the retail enterprise agent may still submit a bid.

In block 1708, the system 100 may determine whether negotiation capabilities are enabled for the personal bot agent and the enterprise agents. If the system 100 determines that negotiation capabilities are enabled, the method 1700 may advance to block 1710 in which the personal bot agent and the enterprise agents may negotiate. In some embodiments, the negotiation capabilities may be single modal. Single modal negotiation capabilities may allow the personal bot agent and/or the enterprise agents to negotiate only one value. For example, if the personal bot agent and the retail enterprise agents are able to negotiate only the price of jeans, such negotiation capabilities may be single modal. In some embodiments, the negotiation capabilities may be multi modal. Multi modal negotiation capabilities may allow the personal bot agent and/or the enterprise agents to negotiate more than one value. For example, if the personal bot agent and the retail enterprise agents are able to negotiate the price, color, size, and fit of jeans, such negotiation capabilities may be multi modal.

In an example related to purchasing an internet plan, consider this sample dialog between a personal bot agent and enterprises:

Personal Bot Agent: "Get me Internet plans with good speed, as well as cost efficient."
Enterprise 1: "Here you go."
Enterprise 2: "Here you go."
Personal Bot Agent to Enterprise 1: "The cost seems high. What features are covered? What is your issue resolution time?"
Personal Bot Agent to Enterprise 2: "Can you waive the installation charges?"

In some embodiments, the enabled negotiation capabilities may allow an auction format for the personal bot agent and the enterprise agents. For example, the personal bot agent may generate negotiation bids as global announcements to each of the enterprise agents. For example, the personal bot agent may generate an auction announcement including a request for data to Enterprise Agent 1, Enterprise Agent 2, Enterprise Agent 3, and Enterprise Agent 4 illustrated in FIGS. 18-20 (see the data announcement in the scheme 1800 depicted in FIG. 18). The enterprise agents may publish their bids to the personal bot agent. For example, Enterprise Agent 1 may submit a Bid Value 1000, Enterprise Agent 2 may submit a Bid Value 1500, Enterprise Agent 3 may submit a Bid Value 1500, and Enterprise Agent 4 may submit a Bid Value 1100 (see the data bidding in the scheme 1900 depicted in FIG. 19). The personal bot agent may select Enterprise Agent 2 and Enterprise Agent 3 (see the bid selection process in the scheme 2000 depicted in FIG. 20). It should be appreciated that the format may become an auction pool in which each of the enterprise agents is informed regarding which enterprise agent was selected by the personal bot agent.

In some embodiments, the negotiation capabilities may allow a negotiation based on incentive mechanisms for data sharing and usage. For example, if an enterprise requests an end user for permission to use the end user's personal data for prediction, personalization, and marketing, an enterprise agent for the enterprise may communicate with the end user's personal bot agent to ask whether the enterprise agent may use the respective data for a fixed incentive (e.g., points, cryptocurrency, cash payment, etc.). The personal bot agent may analyze the enterprise agent's query and then continue to negotiate with the enterprise agent until the personal bot determines that a sufficient deal regarding the requested data has been achieved for the end user. After the personal bot agent and the enterprise agents complete the negotiations, the method 1700 may advance to block 1712, which such block 1712 is described below.

Referring back to block 1708, if the system 100 determines that negotiation capabilities are not enabled for the personal bot agent and the enterprise agents, the method 1700 may advance to block 1712 in which the personal bot agent may analyze the one or more bids and may select one or more enterprise agents. For example, the personal bot agent may analyze the one or more bids to find a match between the request for data included in the announcement and the one or more bids including the requested data and/or data that is that is similar to the requested data stored by one or more enterprises. If the personal bot agent finds a perfect match between the request for data and the requested data, then the personal bot agent may select the one or more enterprise agents having the perfect match. If the personal bot agent does not find a perfect match between the request for data and the requested data (i.e., finds an imperfect match between the request for data and the data that is similar to the requested data), then the personal bot agent may select the one or more enterprise agents having the imperfect match. The personal bot agent may communicate the one or more enterprise agent selections to the one or more successfully selected enterprises. For example, FIG. 20 illustrates at least one embodiment of the bid selection process described in reference to block 1712 of FIG. 17. Referring to FIG. 20, the personal bot agent may select Enterprise Agent 2 and Enterprise Agent 3. Returning to the retail purchasing scenario, the personal bot agent may analyze one or more jeans bids received from one or more retail enterprises by comparing the jeans product query (e.g., data announcement) to the one or more jeans bids submitted by the one or more retail enterprises to find a match. If there is a perfect match to the color, brand, size, fit, and price of the jeans product query to one or more bids received from one or more retail enterprises, then the personal bot agent may select the one or more retail enterprises and communicate such selection to the one or more enterprises that submitted bids. If there is not a match to the color, brand, and price but there is a match to the size and fit of the jeans product query to one or more bids received from one or more retail enterprises (e.g., an imperfect match), then the personal bot agent may select the one or more retail enterprises and communicate such selection to the one or more enterprises that submitted bids.

In block 1714, the personal bot agent may display the selected enterprise agents to the end user via a graphical user interface of the personal bot system. For example, the details of a jeans offer of the one or more retail enterprise agents may be displayed to the end user. In block 1716, the personal bot agent may determine whether an indication has been received that an end user has selected one or more enterprise agents. If the personal bot agent determines that an indication has been received that an end user has selected one or more enterprise agents, then the method 1700 may advance to block 1718 in which the one or more selected enterprise agents may transmit the requested data to the end user. After the transmission of the one or more selected enterprise agents to the end user, a direct communication may be formed between the end user and the one or more selected enterprise agents and a data transaction may be completed. In some embodiments, the personal bot may no longer be needed in the interaction. In some embodiments, one or more smart contracts may be used to complete the process (e.g., complete payment, delivery, etc.). For example, a retail enterprise agent may directly transmit the details of a jeans offer to the end user, and the end user may directly purchase the jeans from the retail enterprise and choose delivery options. If the personal bot agent determines that an indication has not been received that an end user has selected one or more enterprise agents, then the method 1700 may terminate (e.g., such that the one or more enterprise agents do not transmit the requested data to the end user)

The personal bot agent may store all of the requested data received by the end user from all of the announcements including requests for data (e.g., products ordered by the end user). The personal bot agent may also store the end user preferences. For example, the personal bot agent may store a record that the end user prefers wearing regular fit jeans, and the personal bot agent may not ask the end user for the jeans fit again; however, the end user may edit the jeans fit preference at any time. Additionally, the personal bot agent may access a software wallet (e.g., the software wallet 138) to obtain an end user preferences (e.g., jeans size preferences) maintained by the software wallet. In some embodiments in which an end user grants authorization to an enterprise to access end user preferences, the personal bot agent may utilize the end user preferences maintained by the software wallet to automatically interact with enterprise agents of the enterprise.

After a data transaction is completed, the personal bot agent and the enterprise agents may update their artificial intelligence and/or machine learning models based on the interaction between the personal bot agent and the enterprise agent resulting in a completed transaction (i.e., update the models through interaction feedback). In some embodiments, one or more of the machine learning and/or artificial intelligence algorithms, techniques, and/or mechanisms described herein may be utilized to achieve the updates. Additionally, after a data transaction is completed, the data transaction may be stored on the blockchain. In some embodiments, the system 100 may execute the method 500 of FIG. 5 (or a portion thereof) as described in detail above in association with the method 1700 of FIG. 17. Further, in some embodiments, one or more smart contracts of the blockchain network may be used to automatically perform the functions disclosed herein by the personal bot agent and/or the enterprise agents, which may reduce the risk of data tampering.

Although the blocks 1702-1718 are described in a relatively serial manner, it should be appreciated that various blocks of the method 1700 may be performed in parallel in some embodiments.

What is claimed is:

1. A method for transfer of data in a multi-agent enterprise system comprising a first enterprise and a second enterprise using a permissioned blockchain infrastructure, the method comprising:
   receiving, by a personal bot agent of an end user device, a request for data from an end user;
   transmitting, by the personal bot agent of the end user device, an announcement including the request for data to a plurality of enterprise agents of the enterprise system via corresponding enterprise application programming interfaces (APIs), wherein each enterprise agent of the plurality of enterprise agents corresponds with a different enterprise of the enterprise system and is associated with a different enterprise API;
   receiving, by the personal bot agent of the end user device, corresponding responses from the plurality of enterprise agents in response to the announcement, wherein each response of the corresponding responses identifies one or more capabilities of the corresponding enterprise agent relevant to the requested data;
   analyzing, by the personal bot agent of the end user device and using machine learning, the corresponding responses from the plurality of enterprise agents;
   selecting, by the personal bot agent of the end user device, the at least one of the first enterprise and the second enterprise in response to analyzing the corresponding responses from the plurality of enterprise agents;
   displaying, by the personal bot agent of the end user device, the at least one of the first enterprise and the second enterprise to the end user;
   receiving, by the personal bot agent of the end user device, an indication that the end user has selected the first enterprise;

using the personal bot agent as a connection medium between the end user device and the enterprise agent of the first enterprise to establish, by the end user device, a direct communication between the end user and the enterprise agent of the first enterprise via the corresponding enterprise API of the first enterprise in response to receiving the indication that the end user has selected the first enterprise;

transmitting, by the enterprise agent of the first enterprise, the requested data to the end user thereby completing the transfer of data in the multi-agent enterprise system; and updating, by the personal bot agent of the end user device, a machine learning model based on interactions between the personal bot agent and the plurality of enterprise agents culminating in the transmittal of the requested data to the end user; and further comprising:

storing a data transaction corresponding with the transfer of data on a blockchain by (i) generating a block representing the data transaction in the blockchain infrastructure, (ii) publishing the block to one or more nodes in the blockchain infrastructure, (iii) validating the data transaction at the one or more nodes in the blockchain infrastructure, (iv) adding the block to the blockchain based on a consensus reached among the one or more nodes in the blockchain infrastructure, (v) updating the one or more nodes in the blockchain infrastructure with the block, and (vi) labeling the data transaction as successful;

wherein the block includes self-executing computer-executable code configured to cause an update to the machine learning model in response to storing the data transaction on the blockchain.

2. The method of claim 1, further comprising autonomously negotiating, by the personal bot agent of the end user device using machine learning, with each of the plurality of enterprise agents regarding the corresponding responses of the plurality of enterprise agents in response to receiving the corresponding responses.

3. The method of claim 1, further comprising evaluating, by each of the plurality of enterprise agents, the requested data stored by the corresponding enterprise agent to determine a match between the request for data and the requested data in response to receiving the announcement from the personal bot agent of the end user device.

4. The method of claim 3, wherein the plurality of enterprise agents submit the corresponding responses to the personal bot agent of the end user device based on the match.

5. The method of claim 1, wherein selecting the at least one of the first enterprise and the second enterprise comprises comparing end user preferences to the corresponding responses to determine a second match.

6. The method of claim 1, wherein at least one of the enterprise system, the first enterprise, or the second enterprise comprises a contact center system.

7. A system for transfer of data using a permissioned blockchain infrastructure, the system comprising:

an enterprise system comprising a first enterprise and a second enterprise, wherein at least one of the enterprise system, the first enterprise, or the second enterprise comprises a contact center system;

at least one processor; and at least one memory comprising a plurality of instructions stored thereon that, in response to execution by the at least one processor, causes the system to:

receive, by a personal bot agent of an end user device, a request for data from an end user;

transmit, by the personal bot agent of the end user device, an announcement including the request for data to a plurality of enterprise agents of the enterprise system via corresponding enterprise application programming interfaces (APIs), wherein each enterprise agent of the plurality of enterprise agents corresponds with a different enterprise of the enterprise system and is associated with a different enterprise API;

receive, by the personal bot agent of the end user device, corresponding responses from the plurality of enterprise agents in response to the announcement, wherein each response of the corresponding responses identifies one or more capabilities of the corresponding enterprise agent relevant to the requested data;

analyze, by the personal bot agent of the end user device and using machine learning, the corresponding responses from the plurality of enterprise agents;

select, by the personal bot agent of the end user device, the at least one of the first enterprise and the second enterprise in response to analysis of the corresponding responses from the plurality of enterprise agents;

display, by the personal bot agent of the end user device, the at least one of the first enterprise and the second enterprise to the end user;

receive, by the personal bot agent of the end user device, an indication that the end user has selected the first enterprise;

use the personal bot agent as a connection medium between the end user device and the enterprise agent of the first enterprise to establish, by the end user device, a direct communication between the end user and the enterprise agent of the first enterprise via the corresponding enterprise API of the first enterprise in response to receipt of the indication that the end user has selected the first enterprise;

transmit, by the enterprise agent of the first enterprise, the requested data to the end user thereby completing the transfer of data in the multi-agent enterprise system; and update, by the personal bot agent of the ender user device, a machine learning model based on interactions between the personal bot agent and the plurality of enterprise agents culminating in the transmittal of the requested data to the end user; and wherein the plurality of instructions further causes the system to:

store a data transaction corresponding with the transfer of data on a blockchain by (i) generating a block representing the data transaction in the blockchain infrastructure, (ii) publishing the block to one or more nodes in the blockchain infrastructure, (iii) validating the data transaction at the one or more nodes in the blockchain infrastructure, (iv) adding the block to the blockchain based on a consensus reached among the one or more nodes in the blockchain infrastructure, (v) updating the one or more nodes in the blockchain infrastructure with the block, and (vi) labeling the data transaction as successful;

wherein the block includes self-executing computer-executable code configured to cause an update to the machine learning model in response to the data transaction being stored on the blockchain.

8. The system of claim 7, wherein the plurality of instructions further causes the system to:

autonomously negotiate, by the personal bot agent of the end user device using machine learning, with each of the plurality of enterprise agents regarding the corresponding responses of the plurality of enterprise agents in response to receiving corresponding responses.

9. The system of claim 7, wherein the plurality of instructions further causes the system to:
evaluate, by each of the plurality of enterprise agents, the requested data stored by the corresponding enterprise agent to determine a match between the request for data and the requested data in response to receiving the announcement from the personal bot agent of the end user device.

10. The system of claim 9, wherein the plurality of enterprise agents submit the corresponding responses to the personal bot agent of the end user device based on the match.

11. The system of claim 7, wherein selecting the at least one of the first enterprise and the second enterprise comprises comparing end user preferences to the corresponding responses to determine a second match.

12. The method of claim 1, wherein analyzing the corresponding responses from the plurality of enterprise agents comprises analyzing the corresponding responses from the plurality of enterprise agents to identify a perfect match for the requested data.

13. The method of claim 1, wherein analyzing the corresponding responses from the plurality of enterprise agents comprises analyzing the corresponding responses from the plurality of enterprise agents to identify an imperfect match for the requested data based on end user preferences and a trained machine learning database.

14. The system of claim 7, wherein to analyze the corresponding responses from the plurality of enterprise agents comprises to analyze the corresponding responses from the plurality of enterprise agents to identify a perfect match for the requested data.

15. The system of claim 7, wherein to analyze the corresponding responses from the plurality of enterprise agents comprises to analyze the corresponding responses from the plurality of enterprise agents to identify an imperfect match for the requested data based on end user preferences and a trained machine learning database.

* * * * *